United States Patent
Wood

(10) Patent No.: US 11,141,673 B1
(45) Date of Patent: Oct. 12, 2021

(54) MODEL ROTORCRAFT WITH LIGHT PIPE SUPPORT MEMBERS

(71) Applicant: TRAXXAS LP, McKinney, TX (US)

(72) Inventor: Jonathan Scott Wood, Plano, TX (US)

(73) Assignee: TRAXXAS LP, McKinney, TX (US)

( * ) Notice: Subject to any disclaimer, the term of this patent is extended or adjusted under 35 U.S.C. 154(b) by 333 days.

(21) Appl. No.: 15/279,385

(22) Filed: Sep. 28, 2016

Related U.S. Application Data

(60) Provisional application No. 62/233,999, filed on Sep. 28, 2016.

(51) Int. Cl.
A63H 27/00 (2006.01)
A63H 30/04 (2006.01)

(52) U.S. Cl.
CPC .............. *A63H 27/12* (2013.01); *A63H 30/04* (2013.01)

(58) Field of Classification Search
CPC ........... B64C 5/02; B64C 27/00; B64C 13/20; G05D 1/00; B64D 1/00; A63H 27/13; A63H 27/00
See application file for complete search history.

(56) References Cited

U.S. PATENT DOCUMENTS

| | | |
|---|---|---|
| 1,749,471 A | 3/1930 | De Bothezat |
| 3,053,480 A | 9/1962 | Vanderlip |
| 3,253,806 A | 5/1966 | Eickmann |
| 3,345,016 A | 10/1967 | Eickmann |
| 3,768,757 A | 10/1973 | Eickmann |
| 4,184,119 A | 1/1980 | Kerruish |
| 5,082,079 A | 1/1992 | Lissaman et al. |
| 5,720,651 A | 2/1998 | Chien |
| D453,317 S | 2/2002 | DeTore et al. |
| D458,892 S | 6/2002 | DeTore et al. |
| D465,196 S | 11/2002 | Dammar |
| 6,626,078 B2 | 9/2003 | Thornton |
| 6,688,936 B2 | 2/2004 | Davis |
| 6,921,313 B2 | 7/2005 | Yu |
| 7,367,863 B2 | 5/2008 | Fosbenner et al. |
| D628,658 S | 12/2010 | Wurm |
| 7,980,740 B2 | 7/2011 | Hu |
| D648,808 S | 11/2011 | Seydoux et al. |
| D659,771 S | 5/2012 | Seydoux et al. |

(Continued)

FOREIGN PATENT DOCUMENTS

| | | |
|---|---|---|
| CN | 202170017 U | 3/2012 |
| CN | 203047531 U | 7/2013 |

(Continued)

OTHER PUBLICATIONS

MATTYP2013; "Phantom/Hero Black for sale" RC Groups bulletin board post; Jan. 13, 2013; http://www.rcgroups.com/forums/showpost.php?p=23798876&postcount=1245.

(Continued)

*Primary Examiner* — Eugene L Kim
*Assistant Examiner* — Christopher Glenn
(74) *Attorney, Agent, or Firm* — Daryl R. Wright; Greg Carr

(57) ABSTRACT

A radio controlled model rotorcraft implemented with features improving flight performance using increasing structural stability and increasing rotorcraft visibility and orientation awareness through the use of multifunctioning, configurable, and aesthetically pleasing components.

20 Claims, 34 Drawing Sheets

(56) References Cited

U.S. PATENT DOCUMENTS

| | | | |
|---|---|---|---|
| 8,282,437 B2 | 10/2012 | Norman et al. | |
| 8,348,712 B2* | 1/2013 | De La Torre | A63H 33/22 |
| | | | 446/34 |
| D691,514 S | 10/2013 | Wang et al. | |
| 8,662,438 B2* | 3/2014 | Savoye | B64C 39/024 |
| | | | 244/17.13 |
| D710,452 S | 8/2014 | Barajas et al. | |
| D710,453 S | 8/2014 | Barajas et al. | |
| D710,454 S | 8/2014 | Barajas et al. | |
| 8,973,861 B2* | 3/2015 | Zhou | A63H 27/12 |
| | | | 244/17.23 |
| 9,004,973 B2 | 4/2015 | Condon et al. | |
| 9,061,763 B1* | 6/2015 | Christensen | B64C 27/32 |
| 9,099,902 B2 | 8/2015 | Chen | |
| 9,208,689 B2 | 12/2015 | Fisher et al. | |
| 9,221,539 B2 | 12/2015 | Christensen et al. | |
| 2002/0098768 A1 | 7/2002 | Kuo et al. | |
| 2002/0142699 A1* | 10/2002 | Davis | A63H 27/12 |
| | | | 446/37 |
| 2004/0150144 A1 | 8/2004 | Goepfert et al. | |
| 2004/0161999 A1* | 8/2004 | Yu | A63H 27/12 |
| | | | 446/36 |
| 2007/0049159 A1* | 3/2007 | Kulis, II | A63H 17/28 |
| | | | 446/438 |
| 2007/0105474 A1* | 5/2007 | Gotou | A63H 27/12 |
| | | | 446/37 |
| 2008/0048065 A1 | 2/2008 | Kuntz | |
| 2009/0283629 A1 | 11/2009 | Kroetsch et al. | |
| 2010/0003886 A1* | 1/2010 | Cheng | A63H 27/12 |
| | | | 446/37 |
| 2010/0124865 A1* | 5/2010 | Van De Rostyne | A63H 27/12 |
| | | | 446/37 |
| 2010/0243794 A1 | 9/2010 | Jermyn | |
| 2011/0017865 A1 | 1/2011 | Achtelik et al. | |
| 2011/0288696 A1 | 11/2011 | Lefebure | |
| 2011/0301784 A1* | 12/2011 | Oakley | G05D 1/0858 |
| | | | 701/2 |
| 2012/0056041 A1* | 3/2012 | Rhee | B64C 25/32 |
| | | | 244/4 R |
| 2012/0078451 A1 | 3/2012 | Ohtomo | |
| 2012/0083945 A1 | 4/2012 | Oakley et al. | |
| 2012/0138732 A1 | 6/2012 | Olm et al. | |
| 2012/0234969 A1 | 9/2012 | Savoye et al. | |
| 2013/0092799 A1 | 4/2013 | Tian et al. | |
| 2014/0032034 A1 | 1/2014 | Raptopoulos et al. | |
| 2014/0099853 A1* | 4/2014 | Condon | A63F 13/245 |
| | | | 446/37 |
| 2014/0117149 A1 | 5/2014 | Zhou et al. | |
| 2014/0131510 A1 | 5/2014 | Wang et al. | |
| 2014/0312169 A1* | 10/2014 | Fisher | B64C 39/12 |
| | | | 244/89 |
| 2014/0339355 A1 | 11/2014 | Olm et al. | |
| 2015/0051755 A1 | 2/2015 | Erhart et al. | |
| 2015/0336670 A1 | 11/2015 | Zhang | |
| 2016/0122017 A1 | 5/2016 | Welker et al. | |
| 2016/0198088 A1 | 7/2016 | Wang et al. | |

FOREIGN PATENT DOCUMENTS

| | | |
|---|---|---|
| CN | 203127141 U | 8/2013 |
| DE | 202013101170 U1 | 5/2013 |
| EP | 1245257 A2 | 10/2002 |
| JP | H01-201294 A | 8/1989 |
| JP | H09187575 A | 7/1997 |

OTHER PUBLICATIONS

Elintocable; "Traxxas QR-1 Quad Rotor"; RC Groups bulletin board post; Nov. 22, 2012; http://www.rcgroups.com/forums/showthread.php?t=1775303&highlight=qr+1#post23336888.

BLADE mQX, Ultra Micro Quad-Copter; Jun. 15, 2012.

BLADE Nano QX 18 Gram Quad-Copter; Jul. 3, 2013.

Hobbico; "Heli Max1SQ Ready-to-Fly Quadcopter", fact sheet; 2012; http://downloads.hobbico.com/factsheets/hmx/hmxe0834-fact-sheet.pdf.

Syma X1 quadcopter; photographed Apr. 22, 2013.

Dualsky, Hornet 460, 9$^{th}$ Shanghai International Model Exhibition 2012; Aug. 28, 2013.

Ariete; "Walkera Hoten X" RC Groups bulletin board post; Jul. 26, 2012; http://www.rcgroups.com/forums/showpost.php?p=22269995&postcount=1.

Walkera; "Ladybird" quadcopter; May 25, 2012.

Walkera; "Scorpion" quadcopter; Jul. 20, 2012.

Walkera; "MX400 UFO" quadcopter; May 23, 2012.

Parrot AR.Drone2.0; photographed May 26, 2012.

Bangkomit; "Hubsan X4H107L"; RC Groups bulletin board post; Mar. 1, 2013; http://www.rcgroups.com/forums/showthread.php?t=1842561#post24290286.

Jameschen072; "The UDi U839 review"; RC Groups; May 15, 2014; http://www.rcgroups.com/forums/showthread.php?t=2167429.

UDI RC; "U839 Nano 3D RC Quadcopter with 6-Axis Gyro, 2.4 GHz 4-Channel. 306°—Rolling Action"; Udirctoys Industry Co,. Ltd., Shantou City, Guangdong, China; photographs of typical unit with manual; Aug. 6, 2014; via Battery Superstore and amazon.com.

WL Toys; "Skylark V636 Headless Mode 2.4 G 4CH 6 Axis Quadcopter RTF"; Shantou Chenghai WL Toys Industrial Co., Ltd., Shantou City, Guangdong, China; web page offer for sale, Banggood.com/Banggood Ltd., Aug. 13, 2014.

Gemini Industries Ltd. / WL Toys; "Skylark R/C Quadcopter"; Gemini Industry Ltd., Shenzen, China; photographs of typical unit with manual; Aug. 13, 2014; via Gemini (HK) Ind. Ltd.

Mohr, Tim; "Hobbico/Great Planes at the '14 HobbyTown USA Convention"; Jul. 11, 2014; Big Squid RC.com.

Barnes, Jon; "HobbyTown National Convention Held Jul. 9, 10, 2014 in Lincoln, Nebraska"; Jul. 19, 2014; Fly RC Magazine web page: http://www.flyrc.com/hobbytown-national-convention-held-july-910-2014-in-lincoln-nebraska/.

Gaui.Co.UK; "Gaui 500X Quad Flyer"; Hinckley, Leicestershire, England; Apr. 27, 2013; https://web.archive.org/web/20130427105355/http://www.gaui.co.uk/.

Empire Hobby; "Gaui LED Set (2 Red, 2Wh, 4 Lens)"; Mesa, Arizona; Jul. 21, 2011; http://www.empirerc.com/gaui-led-set-2-red-2-wh-4-lens-p-5954.html?sess=90d4b90f52b3db5305af59d96954e6fa.

Gaui; "Beijing Model Expo—Gaui 500X Quad Flyer"; Gaui Tai Shih Hobby Corp., New Taipei City, Taiwan; photographs of trade show booth and typical unit; May 1, 2011.

Mulcahy, Chris; "DJI Innovations Phantom RTF—Review"; RCGroups.com; Feb. 5, 2013; http://www.rcgroups.com/forums/showthread.php?t=1811071.

DJI; "Phantom Quick Start Manual V1.3"; DJI Innovations, Shenzhen, China; Jan. 22, 2013.

DJI; "Phantom Advanced Manual V1.1"; DJI Innovations, Shenzhen, China; Jan. 15, 2013.

HGT; "DJI Phantom Full inner nudity"; RC Groups; Jan. 11, 2013; http://www.rcgroups.com/forums/showpost.php?p=23788478&postcount=1121.

Draganfly; "DraganFlyer X4-P"; Draganfly Innovations Inc., Saskatoon, Canada; Mar. 23, 2013; http://www.draganfly.com/uav-helicopter/draganflyer-x4p/gallery/pictures/.

Draganfly; "Draganflyer X4-P"; Draganfly Innovations Inc., Saskatoon, Canada; Apr. 3, 2013; http://www.draganfly.com/uav-helicopter/draganflyer-x4p/gallery/pictures/.

Parrot; "AR.Drone 2.0 User Guide"; Parrot SA, Paris, France; May 3, 2012; http://ardrone2.parrot.com/support.

Hubsan; "The Hubsan X4 2.4GHz R/C Series 4 Channel Six-Axis Gyro" photographs of typical unit with manual; ; Hubsan, Tangxia Town, Dong guan, China; Sep. 10, 2012.

Horizonhobby; "Blade Mqx Ultra Micro Quad Copter"; HorizonHobby, Champaign, IL; photographs of typical unit; Jan. 25, 2012.

Horizonhobby; "Blade Nano QX 18 Gram Quad-Copter"; HorizonHobby, Champaign, IL; photographs of typical unit; Jul. 8, 2013.

(56) References Cited

OTHER PUBLICATIONS

DJI; "Phantom"; DJI Innovations, Shenzhen, China; photographs of typical unit; Jan. 31, 2013.
ARES; "Ethos PQ—A Handful of Fun"; Firelands Group, LLC, Champaign, IL; http://ares-rc.com\ethosPQ/ ; Jul. 31, 2014.
Big Squid RC; Ethos PQ Quadcopter; Jul. 31, 2014; Big Squid RC; http://www.bigsquid.rc.com/ethos-pq-quadcopter/.
Hobbytown; "Ethos PQ Instruction Manual"; Firelands Group LLC, Champaign, IL; Jul. 31, 2014.
Hobbico; "Dromida Ominus" quadcopter; Hobbico Inc., Champaign, IL; photographs of typical unit; Sep. 18, 2014.
ARES; "Ethos HD Large Quad, Full 1080 HD Video, One Package"; Firelands Group, LLC, Champaign, IL; Jul. 2014.
Parrot; "AR.Drone 2.0" web page; Parrot SA, Paris, France; Jan. 2012.
Wikipedia; "Parrot AR.Drone"; Parrot SA, Paris, France; Jan. 2013.
Parrot; "AR.Drone 2.0" photographs of typical unit; Parrot SA, Paris, France; May 26, 2012.
Mohr, Tim; "Firelands Group at the 2014 HobbyTown USA Convention, ARES RC Ethos PQ nano quad"; Jul. 11, 2014; Big Squid RC.com.
Sievers, Steve. "Fundamentals of LED Light Pipes." May 8, 2013. <electronicdesign.com/components/fundamentals-led-light-pipes>.
"Light Up Your Plane With LEDs." Author Unknown. Fly RC Magainze. Jan. 1, 2010. <www.flyrc.com/light-up-your-plane-with-LEDs/>.
Sky-Hero, Spyder, Jan. 2015, http://www.sky-hero.com/en/content/12-spyder-black-edition.
Team Black Sheep, TBS Discovery, Jan. 2015, http://team-blacksheep.com/products/product:98.
PCT/US2014/051361; International Search Report and Written Opinion; dated Dec. 15, 2015.

\* cited by examiner

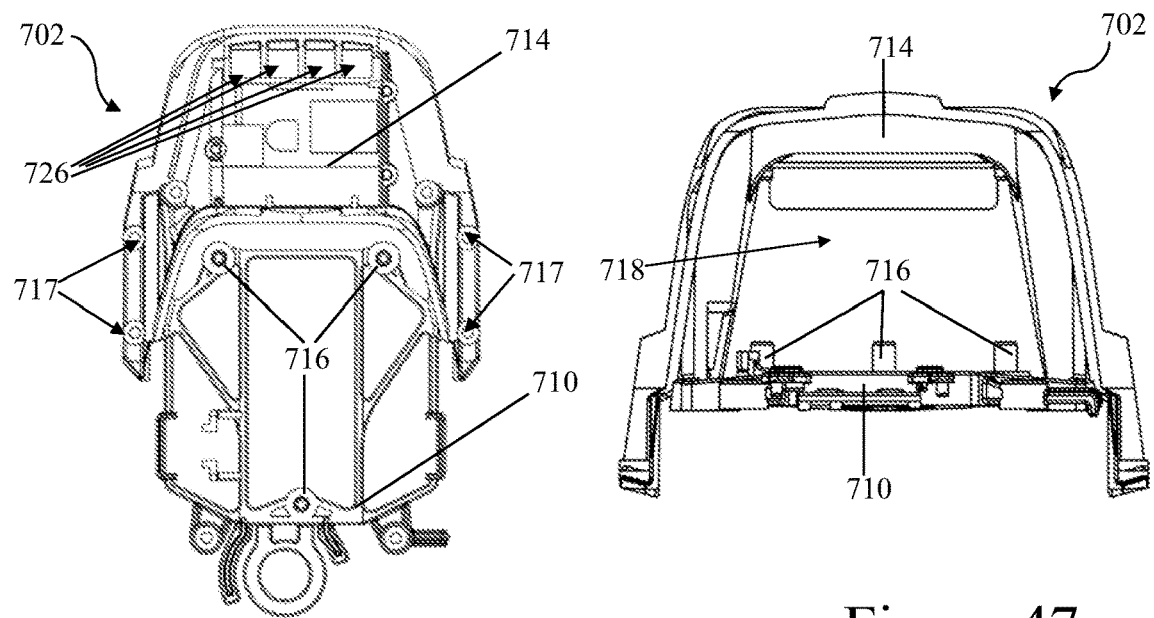
Figure 46
Figure 47
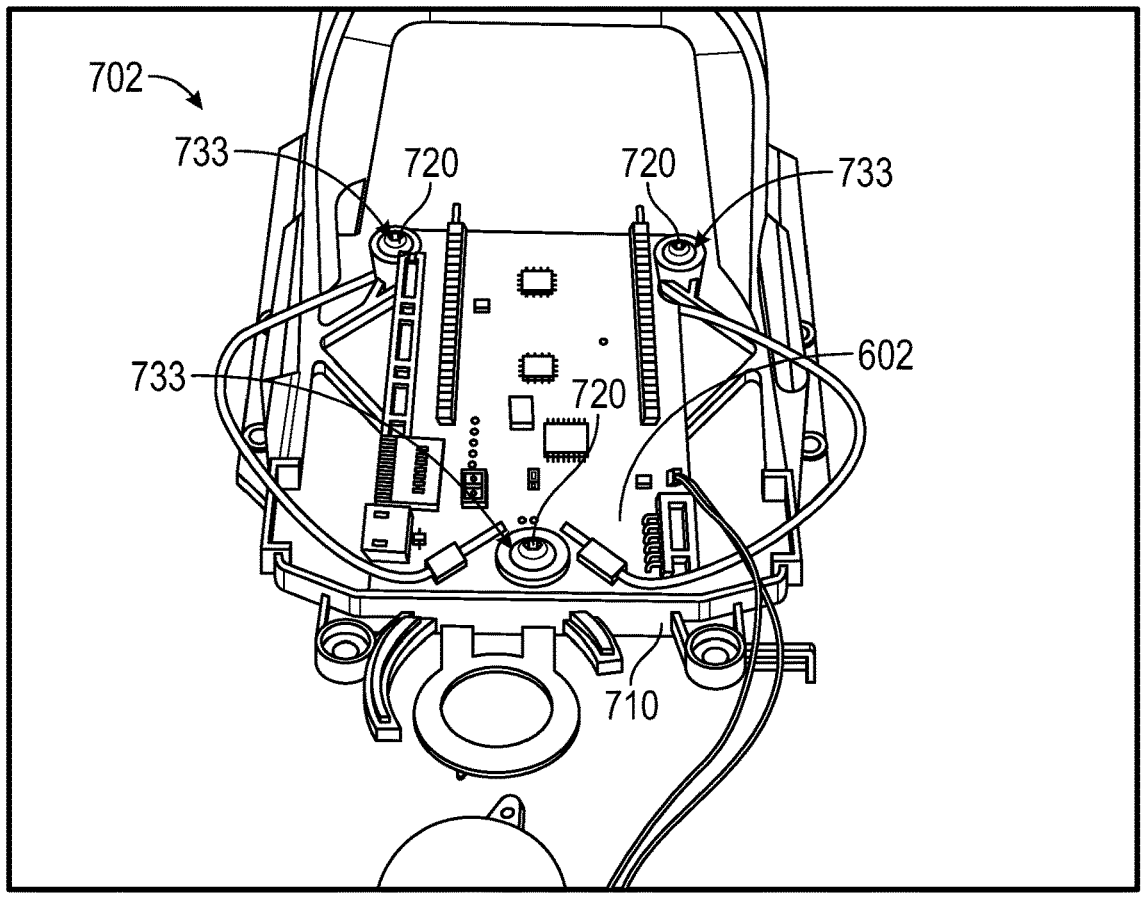
Figure 48

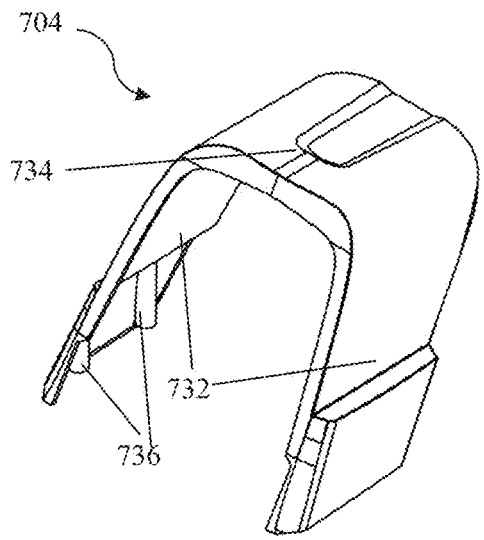
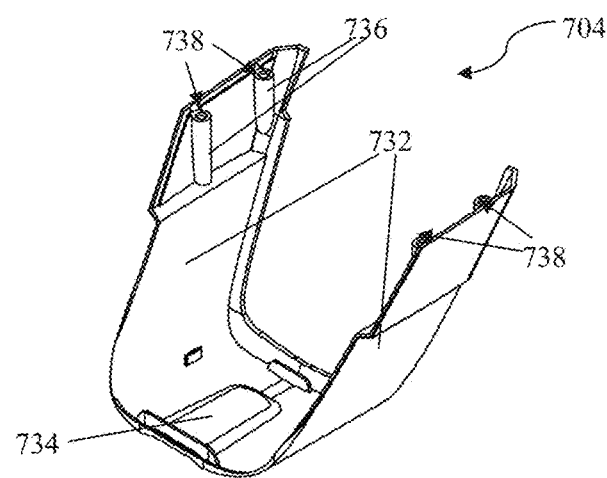
Figure 53    Figure 54
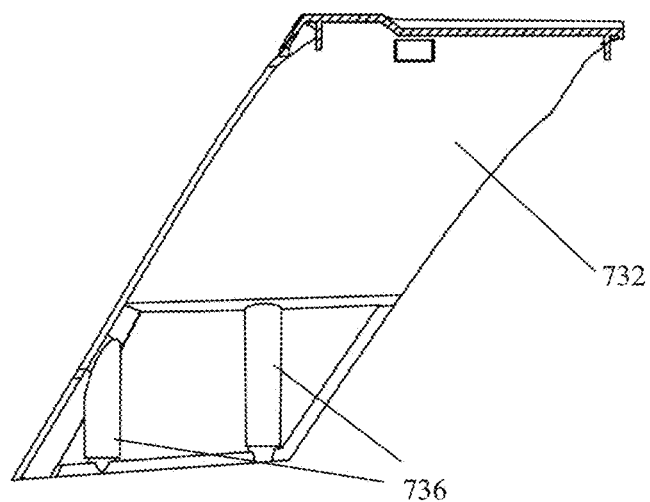
Figure 55

MODEL ROTORCRAFT WITH LIGHT PIPE SUPPORT MEMBERS

CROSS-REFERENCE TO RELATED APPLICATIONS

This application relates to, and claims the benefit of the filing date of, U.S. provisional patent application Ser. No. 62/233,999 entitled "MODEL ROTORCRAFT WITH LIGHT PIPE SUPPORT MEMBERS", filed Sep. 28, 2015, the entire contents of which are incorporated herein by reference for all purposes.

BACKGROUND OF THE INVENTION

Field of the Invention

The present invention relates to radio controlled model aircraft and, more particularly, to components of radio controlled model aircraft for enhancing various aspects of a rotorcraft.

SUMMARY

The present invention provides a radio controlled model rotorcraft implemented with features improving user control and flight performance by improving structural stability, increased rotorcraft visibility, and increased resistance to impact, crashes, and vibration.

BRIEF DESCRIPTION OF THE FIGURES

For a more complete understanding of the present invention and the advantages thereof, reference is now made to the following Detailed Description taken in conjunction with the accompanying drawings, in which:

FIGS. 44-47 are perspective, side, top, and front views, respectively, of the sensor board mount;

FIG. 48 is a view of the flight control board being mounted on the sensor board mount;

FIGS. 53 and 54 are perspective views of the roll hoop canopy;

FIG. 55 is an interior side view of the roll hoop canopy side panel;

DETAILED DESCRIPTION OF THE INVENTION

The entire contents of U.S. Pat. No. 9,061,763, entitled: "Rotorcraft with integrated light pipe support members" issued on Jun. 23, 2016, and U.S. patent application Ser. No. 14/542,503, entitled: "ROTORCRAFT WITH INTEGRATED LIGHT PIPE SUPPORT MEMBERS," filed on Nov. 14, 2014, are incorporated herein by reference for all purposes.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, and for the most part, details concerning well-known features and elements have been omitted inasmuch as such details are not considered necessary to obtain a complete understanding of the present invention, and are considered to be within the understanding of persons of ordinary skill in the relevant art. Additional details are shown in the Appendix attached hereto and incorporated by reference for all purposes.

Figure 1:
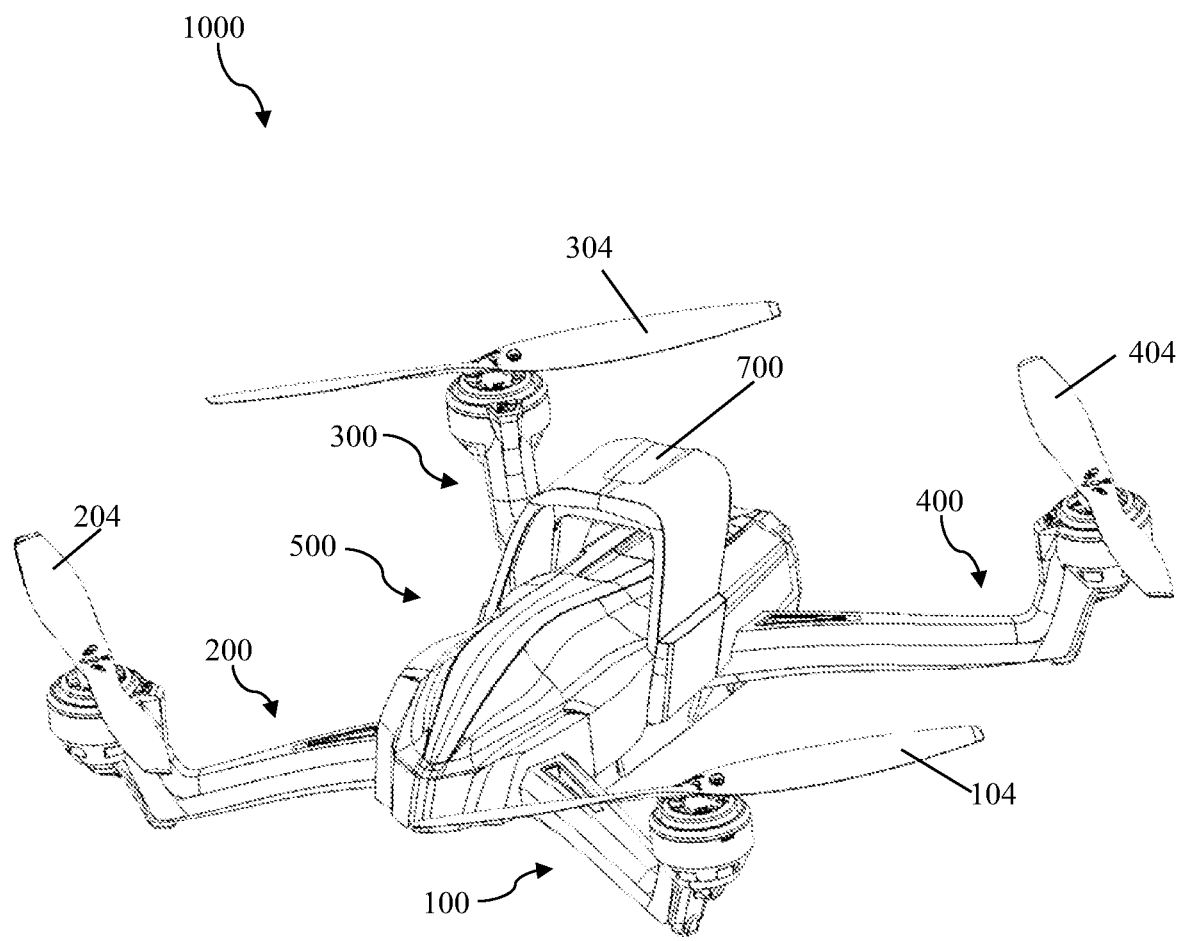
FIGS. 1-3 are perspective, top and bottom views, respectively of a model rotorcraft.
Figure 7:
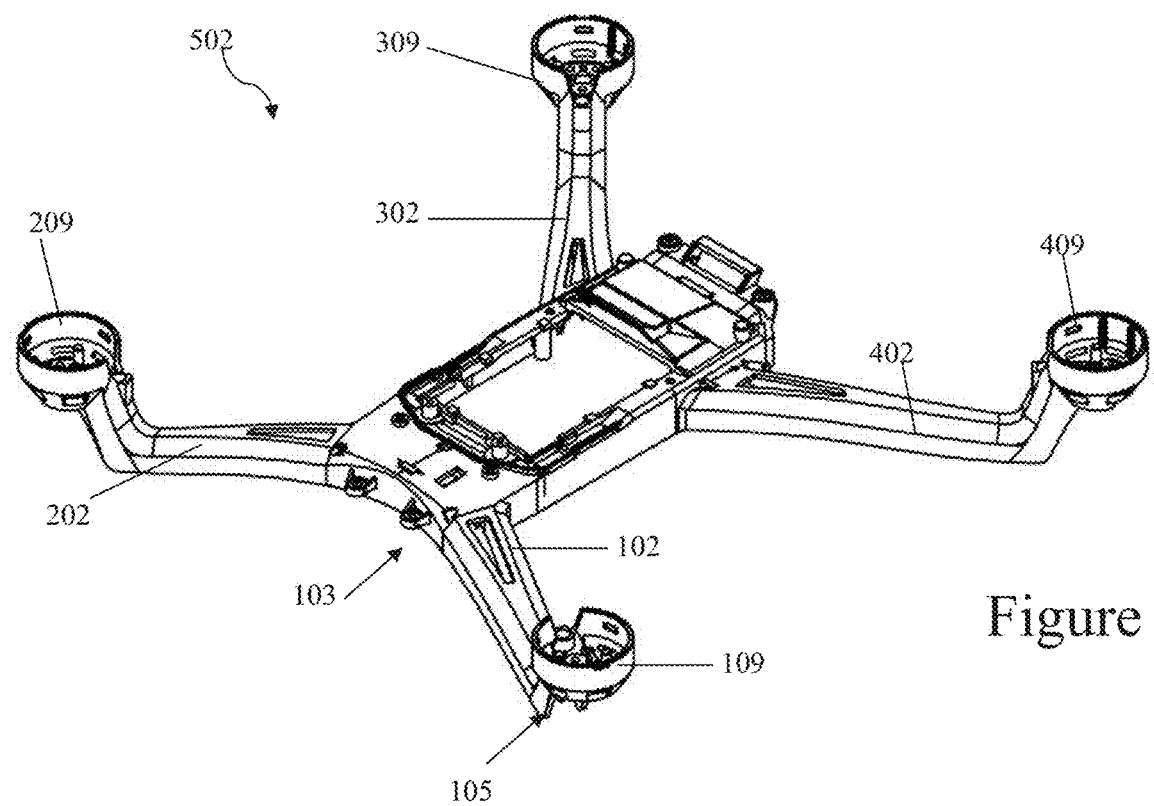

Turning to FIG. 1, an embodiment of a model rotorcraft 1000 is shown. In the embodiment shown, the rotorcraft 1000 may comprise a center pod assembly 500, a roll hoop 700, and four rotor assemblies: a first rotor assembly 100; a second rotor assembly 200; a third rotor assembly 300; and a fourth rotor assembly 400. Each of rotor assemblies 100, 200, 300, 400 may couple to the center pod assembly 500 at an inboard end (103 in FIG. 7) of the rotor assembly 100, 200, 300, and 400, and may extend, along its length, away from the center pod assembly 500. Each of the rotor assemblies 100, 200, 300, and 400 may be implemented with a first propeller 104, a second propeller 204, a third propeller 304, and a fourth propeller 404, respectively.

The components of the first rotor assembly 100 of an embodiment of the model rotorcraft 1000 are described herein. The components of the rotor assemblies 200, 300, and 400 may have substantially similar construction and features as the corresponding components of the first rotor assembly 100. Further, the components of the rotor assemblies 200, 300, and 400 may perform substantially the same functions as the corresponding components of the first rotor assembly 100. The convention of describing components of only the first rotor assembly 100 is adopted for the purpose of avoiding unnecessary and repetitive language, only, and shall not foreclose from the scope of this disclosure a wide range of variations, modifications, changes, and substitutions that would be understood by those skilled in the art as expressly, or implicitly, disclosed here.

The first rotor assembly 100 may comprise a first arm 102, a first propeller 104, a first support member 106, a first motor ring 108, In alternative embodiments, additional, fewer, or different components than those shown may be provided.

First Arm Structure

Figure 2:
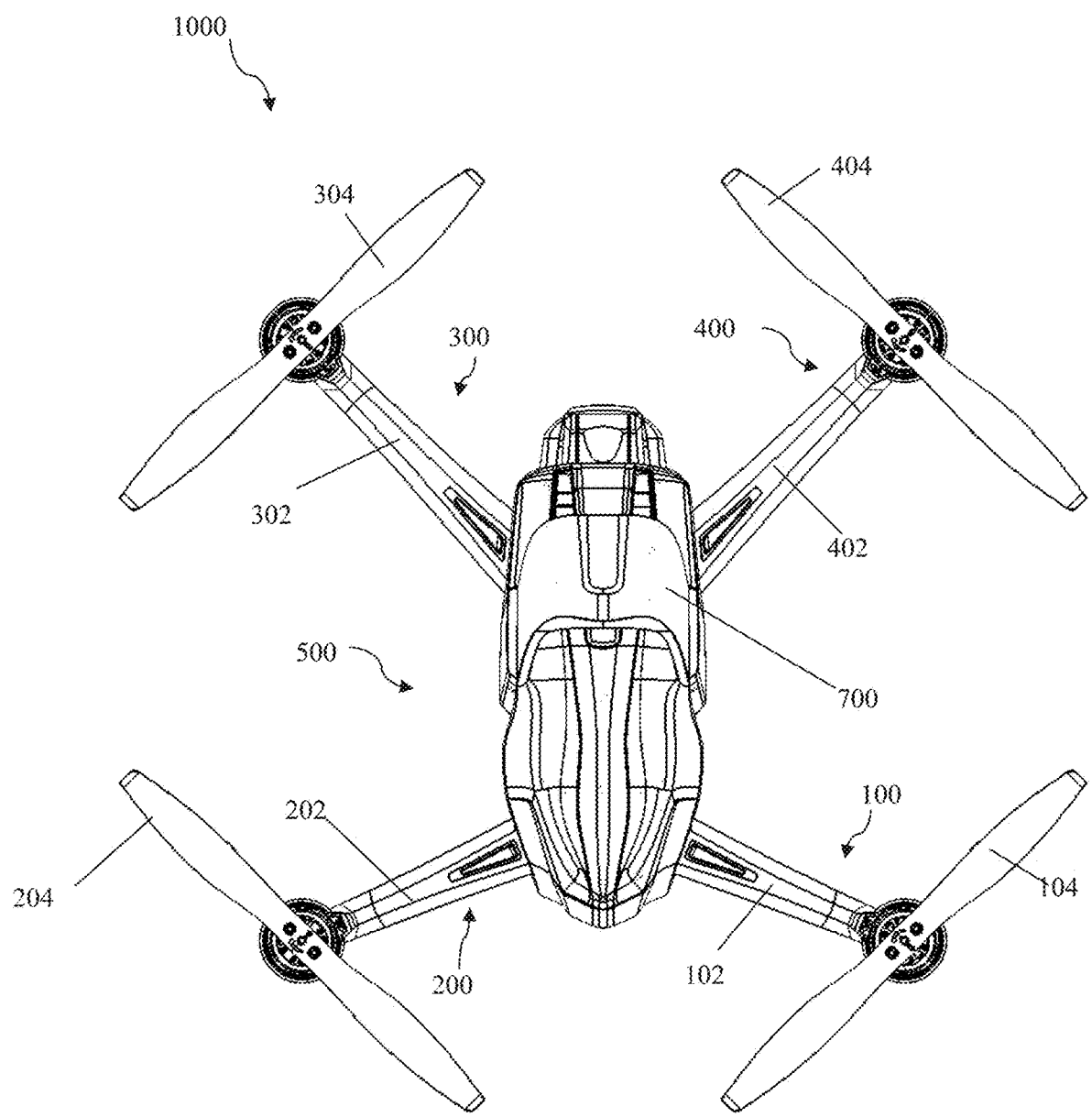
Figure 4:
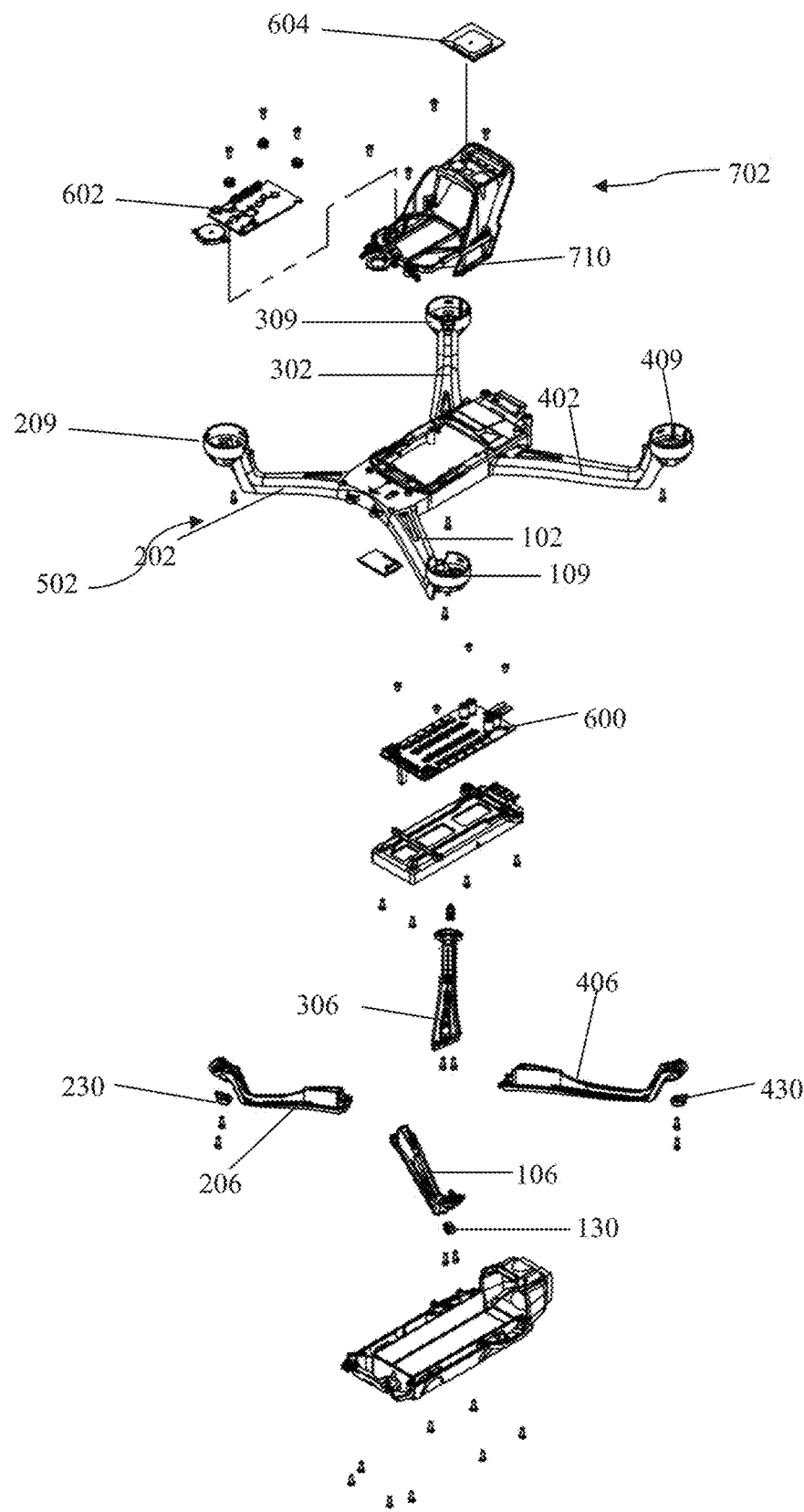
FIG. 4 is an exploded, perspective view of the chassis and the support members.
Figure 8:
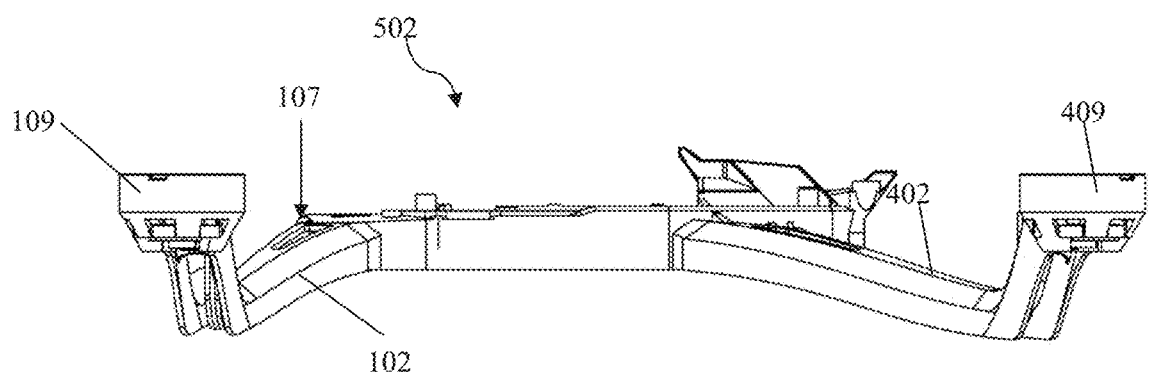
Figure 19:
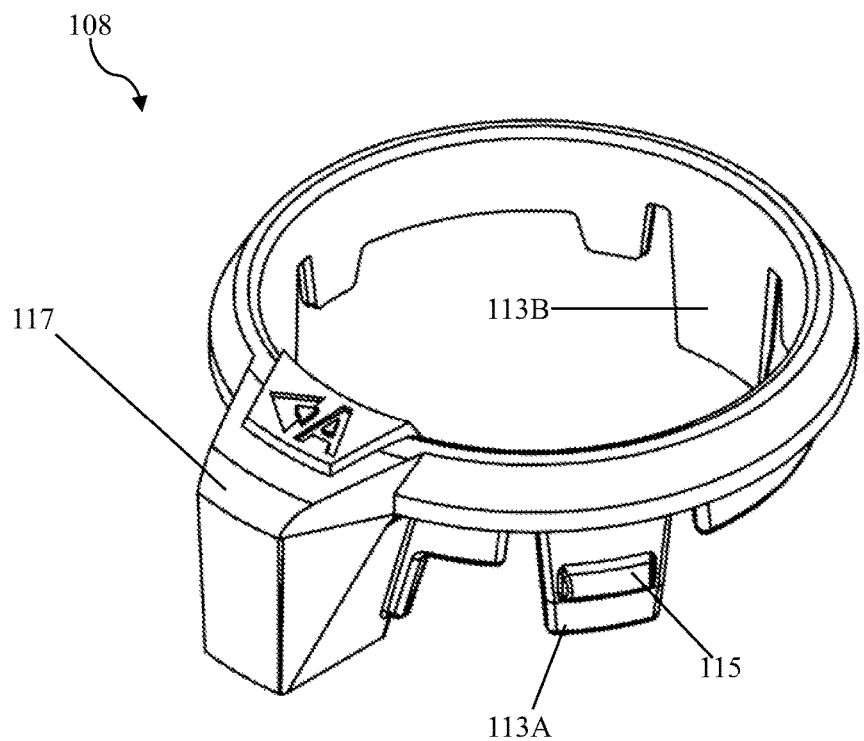
FIG. 19 is a perspective view of a motor ring.

Turning to FIG. 2, in an embodiment, the first arm 102 may operatively couple the first rotor assembly 100 to the center pod assembly 500. As shown in FIGS. 4-7, the first arm 102 may extend from the chassis 502 (as shown in FIG. 4) of the model rotorcraft 1000. The first arm 102 may comprise an inboard end 103, an outboard end 105, a top surface 107 (as shown in FIG. 8), a motor pod 109 and a plurality of coupling members comprising features for coupling with, receiving, or partially forming other rotorcraft 1000 components, such as the first support member 106 (as shown in FIG. 14), the first motor ring 108 (as shown in FIG. 19), and the first propeller 104.

The first arm 102 may be comprised of a single piece of rigid or semi-rigid material. For example, in a particular embodiment, the first arm 102 may be made from nylon or other similar material. It will be understood by persons of ordinary skill in the art that the first arm 102 may alternatively be made from any other suitable material (e.g. plastics, metals, wood, and composites) based on the requirements for flight of the particular model rotorcraft embodiment and other structural, aesthetic, and cost factors.

The first arm 102 may couple to, or, alternatively, be integrally formed with the center pod assembly 500 at the inboard end 103. The first arm 102 may extend along its length in a direction away from the center pod assembly 500. As viewed from the side in FIG. 11, the first arm 102 may have an angled shape that may comprise an initial downwardly sloping arched profile, whereby the first arm 102 may initially arch downwards towards an apex such that the apex of the first arm 102 may be disposed below the inboard end 103. From the apex of the first arm 102, the outboard end 105 of the first arm 102 may angle upwards towards the outboard end 105 and form the motor pod 109. The first arm 102 may angle upwards from the apex of the first arm 102 such that the motor pod 109 may be disposed higher than the inboard end 103. Alternatively, the first arm 102 may have a profile that is substantially linear, dog-legged, or the like, or may have a profile with multiple angles, bends, or curves.

Figure 5:
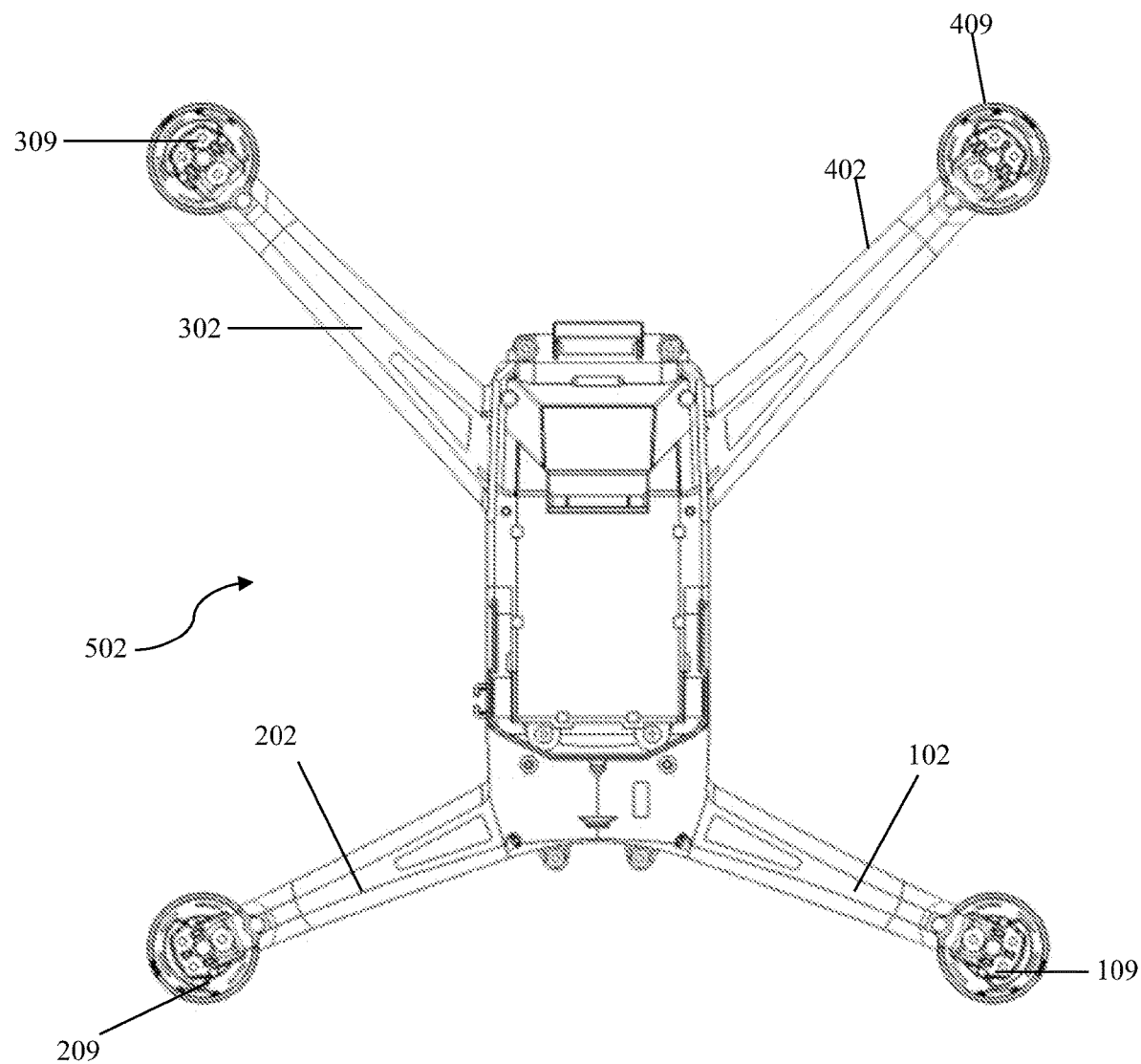
FIGS. 5-8 are top, bottom, perspective, and side views, respectively of the chassis.
Figure 6:
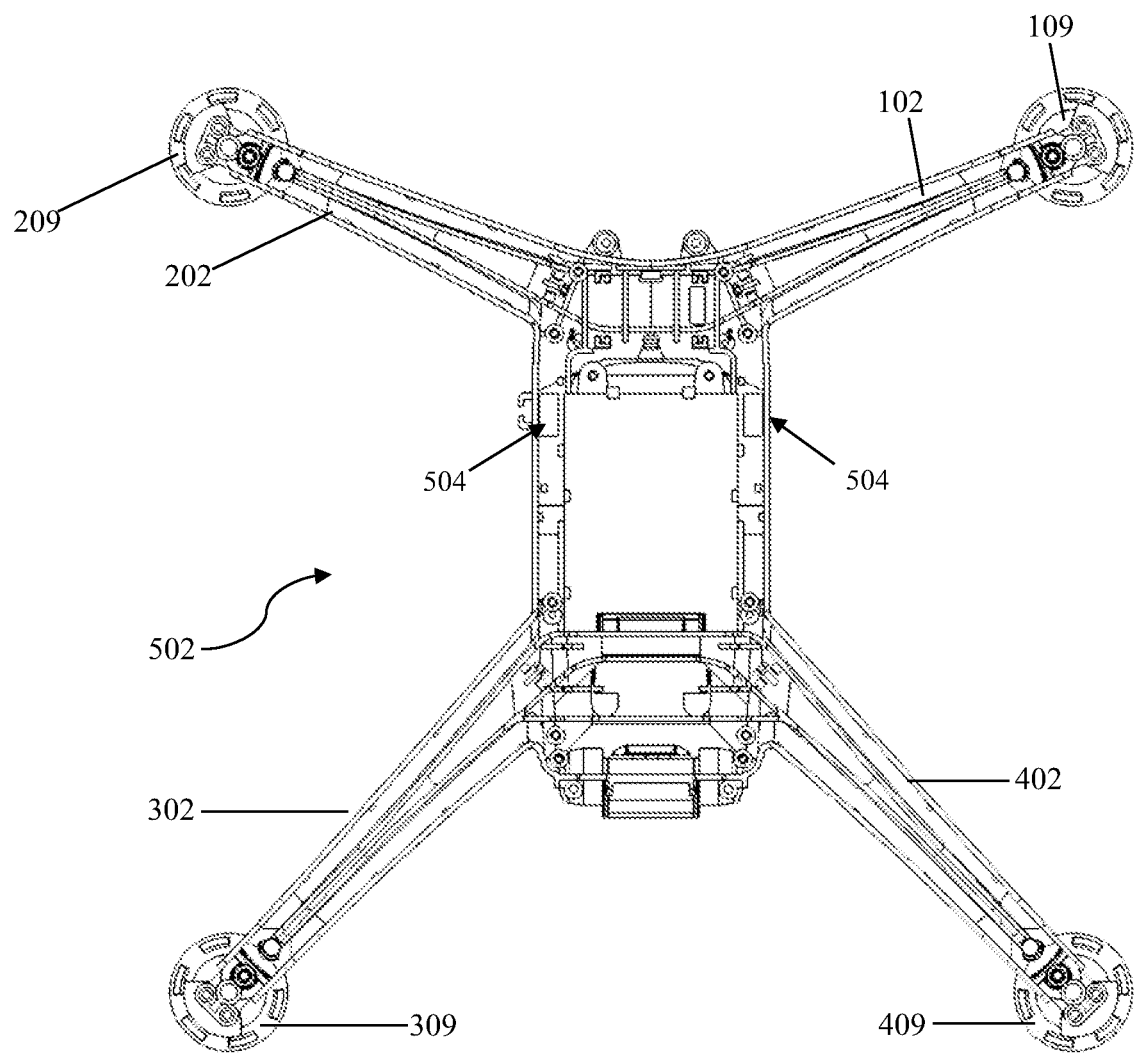
Figure 10:
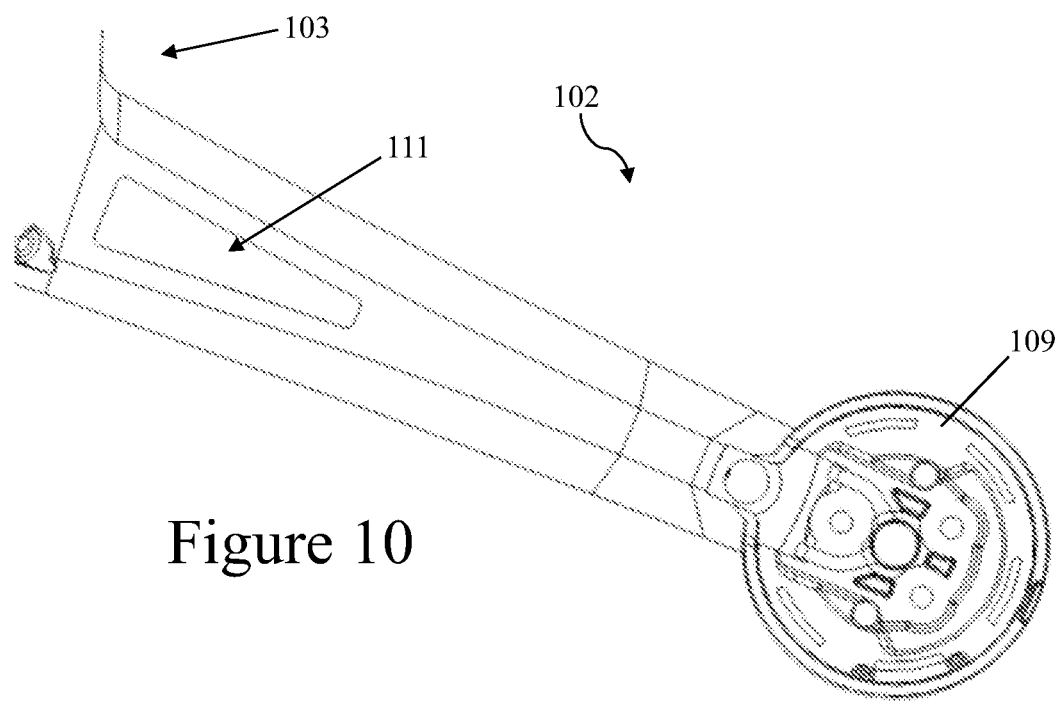

Viewing the first arm 102 from above, as shown in FIGS. 5 and 10, the first arm 102 may be curved along each side, whereby the first arm 102 may be thinner at the outboard end 105 before forming the motor pod 109 and wider at the inboard end 103. Alternatively, the first arm 102 may be straight along each side, but tapered towards the outboard end 105, whereby the first arm 102 may be thinner at the outboard end 105 before forming the motor pod 109 and wider at the inboard end 103. In an alternative embodiment, the first arm may have a substantially uniform width along its length, or, may widen along its length such that the outboard end 105 is wider than the inboard end 103.

Figure 9:
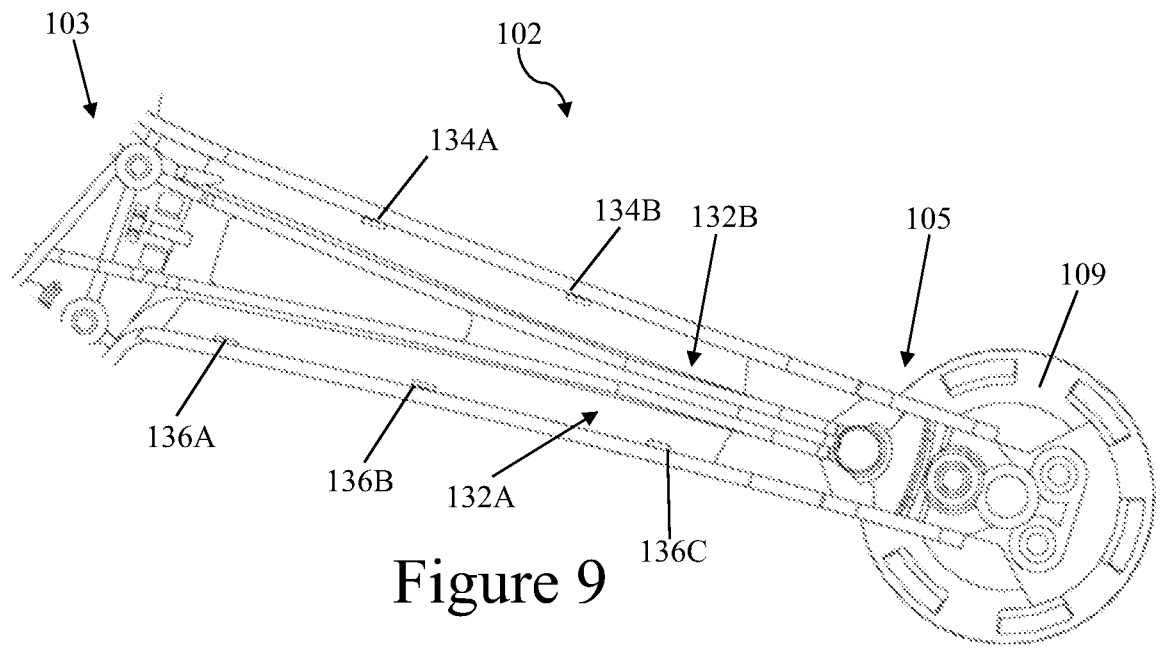
FIGS. 9-11 are bottom, top, and side views, respectively of an arm of the chassis.

Turning to FIGS. 9-13, the motor pod 109 may be formed at the outboard end 105 of the first arm 102. The motor pod 109 may house the first propeller 104, its corresponding motor 101, and all other relevant parts necessary for operation of the first propeller 104. As shown in FIG. 9, the motor pod 109 may comprise a first bulb opening 116, a supporting boss 123, two wire grooves 125, a wire opening 118. Near the outboard end 105 of the first arm 102 where the first arm 102 transitions to the motor pod 109, the first arm 102 may comprise a second bulb opening 120. The first bulb opening 116 may be formed substantially in the center of the pod 109. The supporting boss 123 may be positioned adjacent to the bulb opening 116 towards the first arm 102 such that the supporting boss 123 may be between the first bulb opening 116 and the second bulb opening 120. The first supporting boss 123 may be shaped like a cylinder and may comprise an opening 121. The supporting boss 123 may be flanked by the two wire grooves 125 that extend from the bulb opening 116 to the wire opening 118 on the opposite side of the supporting boss 123. The wire opening 118 may be positioned between the supporting boss 123 and the second bulb opening 120. Each of the wire grooves 125 extend around one side of the supporting boss 123, respectively, and extend toward the wire opening 118. The wire grooves may be sized to firmly seat and secure a wire that may extend from a light source 512. The wire opening 118 may be adjacent to the second bulb opening 120, and may be a substantially rectangular opening in the transition region between the motor pod 109 and the first arm 120. The wire opening 118 may create an access point between the interior portion of the motor pod 109 and the underside of the first arm 102.

Referring to FIG. 9, the first arm 102 may be provided with wire channels 132A and 132B for retaining and routing electrical wires along the length of the first arm 102. In an embodiment, the wires may be routed between rotor assembly 100 components near the outboard end 105 of the first arm 102, like the first motor 101, for example, and controls components that may be enclosed within the center pod assembly 500, like the PCBA, for example, to support powered flight of the rotorcraft 1000.

Each wire channel 132A and 132B may extend along the length of the first arm 102 from the inboard end 103 to the outboard end 105 along the underside of the first arm 102. The wire channels 132A and 132B may be positioned along the outer edges of the first arm 102. In an embodiment, the first arm 102 may have fewer or more wire channels 132 that may extend along only a portion of the length of the first arm 102, or, alternatively, along substantially the entire length of the first arm 102.

Each wire channel 132A, 132B may be provided with retaining tabs 134A-B and 136A-C, respectively, for holding wires A, B in place and substantially resisting migration of wires within each wire channel 132A, 132B. The retaining tabs 134, 136 may also engage with the support member 106 to stiffen the overall rotor assembly 100 when assembled. The retaining tabs 134, 136 may extend laterally across a portion of the width, w, of the respective wire channels 132A, 132B so that the wires A, B may be pushed around the retaining tabs 134, 136 and into place in the wire channels 132A, 132B. Alternatively, the retaining tabs 134, 135 may extend across substantially the entire width of the wire channels 132A, 132B with wires A, B being fed through the gap formed.

In an alternative embodiment, the wire channels 132A, 132B may be provided with fewer or more retaining tabs 134, 136 than shown in FIG. 9. Further, in an alternative embodiment, the wire channels 132A, 132B may be provided with zero retaining tabs 134, 136. In such embodiments, the wire channels A, B may be implemented with other retaining devices, such as external clips, ties, and the like. Alternatively, the wire channels 132A, 132B may not include any retaining devices or external fasteners.

Referring to FIG. 10, the first arm 102 may include a cut through portion 111 forming an opening for seeing through a portion of the first arm 102. In an embodiment, the cut through portion 111 may be disposed along top surface of the first arm 102 along a portion of the length of the first arm 102. In the embodiment shown, the cut through portion 111 may have a substantially trapezoidal shaped perimeter.

In alternative embodiments, the first arm 102 may be provided with zero, one, or a plurality of cut through portions 111. Further, in an alternative embodiment, the cut through portion, or portions, 111 may be positioned at other locations along the outer surface of the first arm 102 and, additionally, may have a different perimeter shape, or shapes. For example, in an embodiment, the first arm may be provided with a plurality of circular cut through portions 111 disposed in an irregular pattern along the length of the outer surface of the first arm 102.

Main Support Arms Structure

Turning to FIGS. 14-18, the first support member 106 may be coupled to the underside of the first arm 102. The first support member 106 may perform many functions, including: providing lighting along the length of the first rotor assembly 100 for aiding users in identifying directional orientation of the rotorcraft 1000 during flight; providing structural support to the first arm 102; receiving, coupling, or securing other components to the rotorcraft 1000.

Figure 14A:
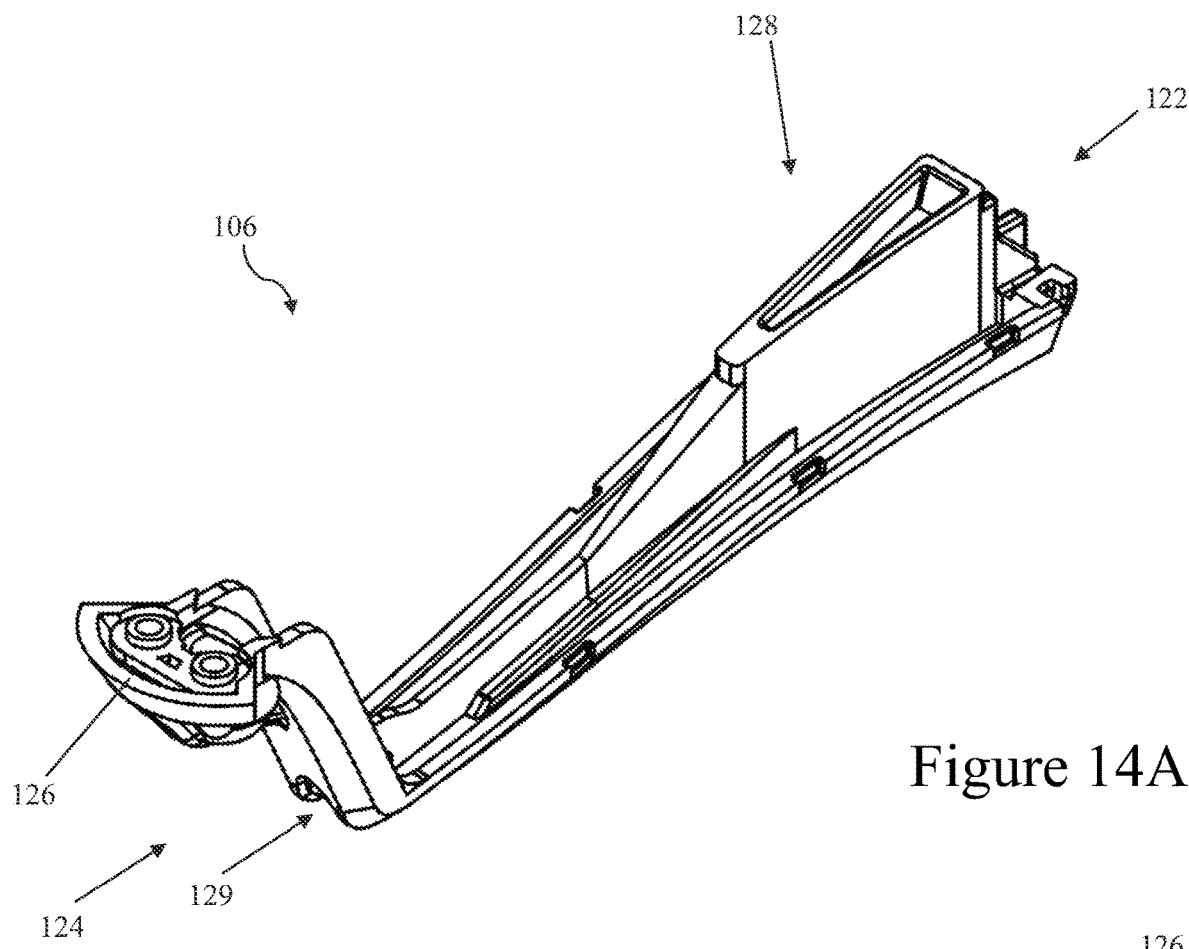
FIGS. 14A and 14*b* are perspective views of a support member.
Figure 14B:
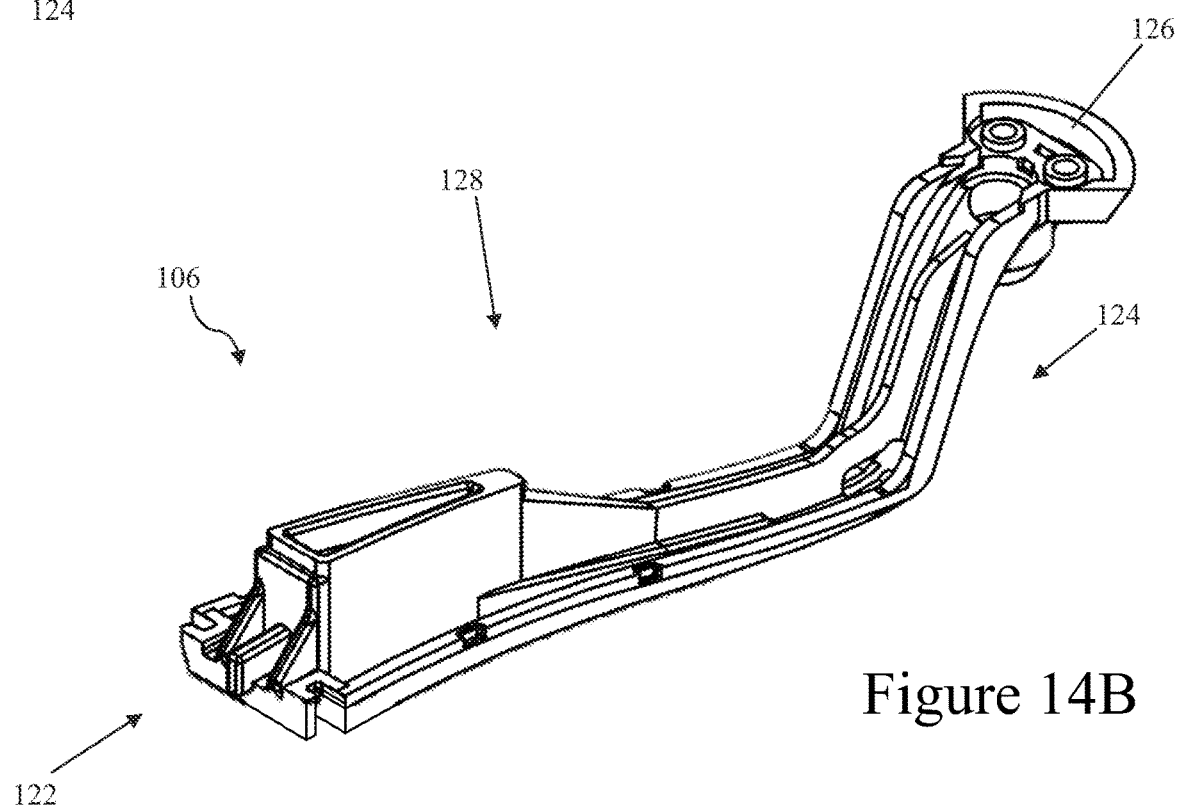

The first support member 106 may couple to the center pod 500 and to the first arm 102. As shown in FIG. 14A, the first support member 106 may comprise an inboard end 122, an outboard end 124, a motor base 126, and an extruded surface 128.

In an embodiment, the first support member 106 may comprise a piece of semi-rigid or rigid material that may be transparent or semi-transparent and capable of distributing light received from a light source 512 substantially throughout its volume, illuminating the surfaces of the transparent or semi-transparent material. For example, the first support member 106 may be made from an acrylic, polycarbonate, or other like material.

The material may appear substantially clear or, alternatively, may have a color. Coloring may be provided through any known methods, such as through tinting, coating, or other known method comprising the prior art. Further, whether the material appears substantially clear, or has a color, the material may be capable of receiving light of a specific color and emitting light of a different color when illuminated. For example, the first support member 106 may be composed of a substantially clear material having the properties described above and may, when receiving white light illuminate and emit light of another color, perhaps green. In another example, the first support member may have a color, perhaps red, and may illuminate and emit red light upon receiving white light or colored light.

In certain embodiments, the first support member 106 may be made entirely of material having the rigidity and illuminating characteristics described above, so that substantially the entire outer surface of the first support member 106 may be illuminated when light is received by any portion of the support member 106. Further, in such an embodiment, the first support member 106 may be made from a single piece of material having the properties described above.

In alternative embodiments, the first support member 106 may be composed of two or more materials, with at least one of the materials having the rigidity and illuminating properties described above. In such an embodiment, the portion of the first support member 106 composed of the material capable of being illuminated may be implemented so that it extends from the inboard end 122 along the length of the first support member 106, and toward the outboard end 124 and the motor base 126. Further, in such an embodiment, the portion of the first support member 106 composed of the material capable of being illuminated may extend along substantially the entire length of the first support member 106.

Figure 3:
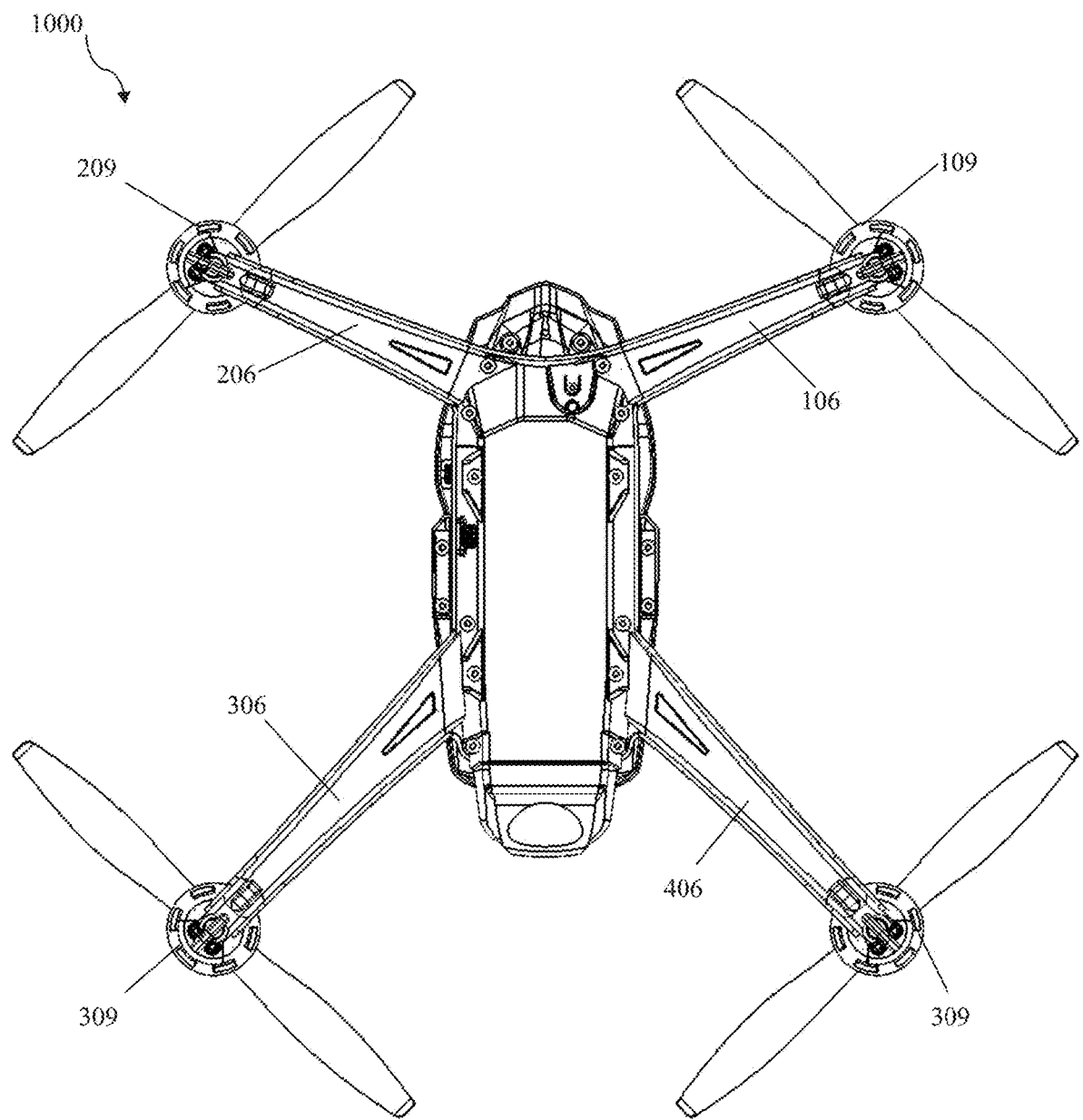
Figure 16:
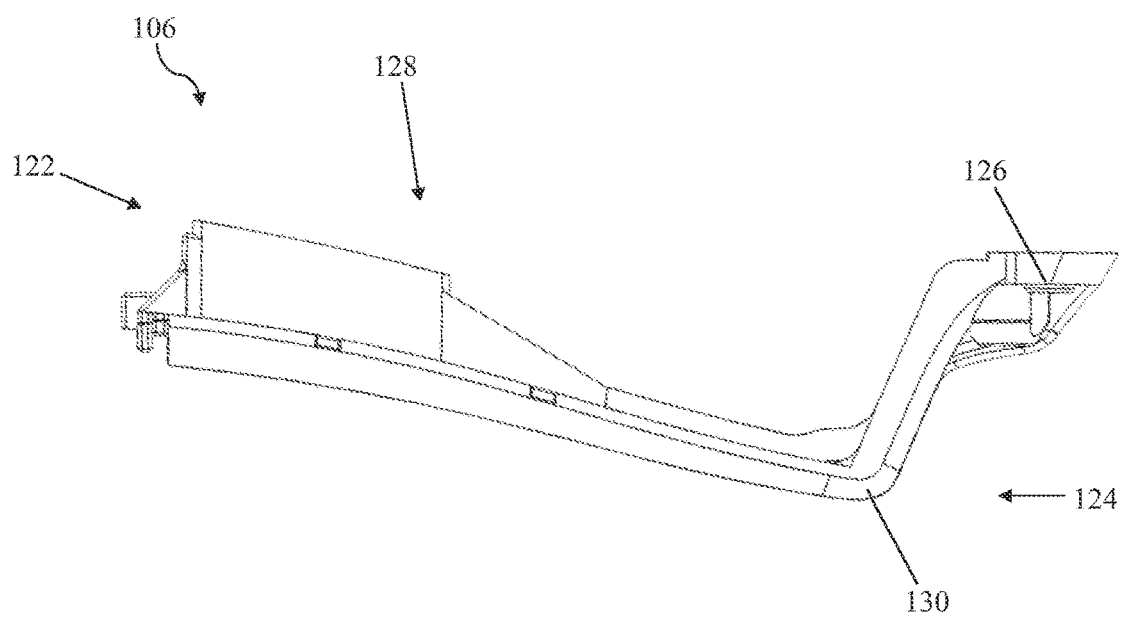

As shown FIG. 3, the first support member 106 may couple to the center pod assembly 500 at the inboard end 122 and extend along its length in a direction away from the center pod assembly 500. Viewed from the side, as shown in FIG. 16, the first support member 106 may have an angled shape that may comprise an initial downwardly sloping arced profile, whereby the first support member 106 may initially arch downwards towards the outboard end 124 such that the apex of the angled first support member 106 may be disposed below the inboard end 122. From the apex portion of the first support member 106, the outboard end 124 of the first support member 106 may angle upwards to form a motor base 126. The first support member 106 may angle upwards from the chassis 502 such that the motor base 126 may be disposed on the same level or higher than the inboard end 122. In alternative embodiments, the first support member 106 may have a profile that is substantially linear, dog-legged, or the like, or may have a profile with multiple angles, bends, or curves.

Figure 17:
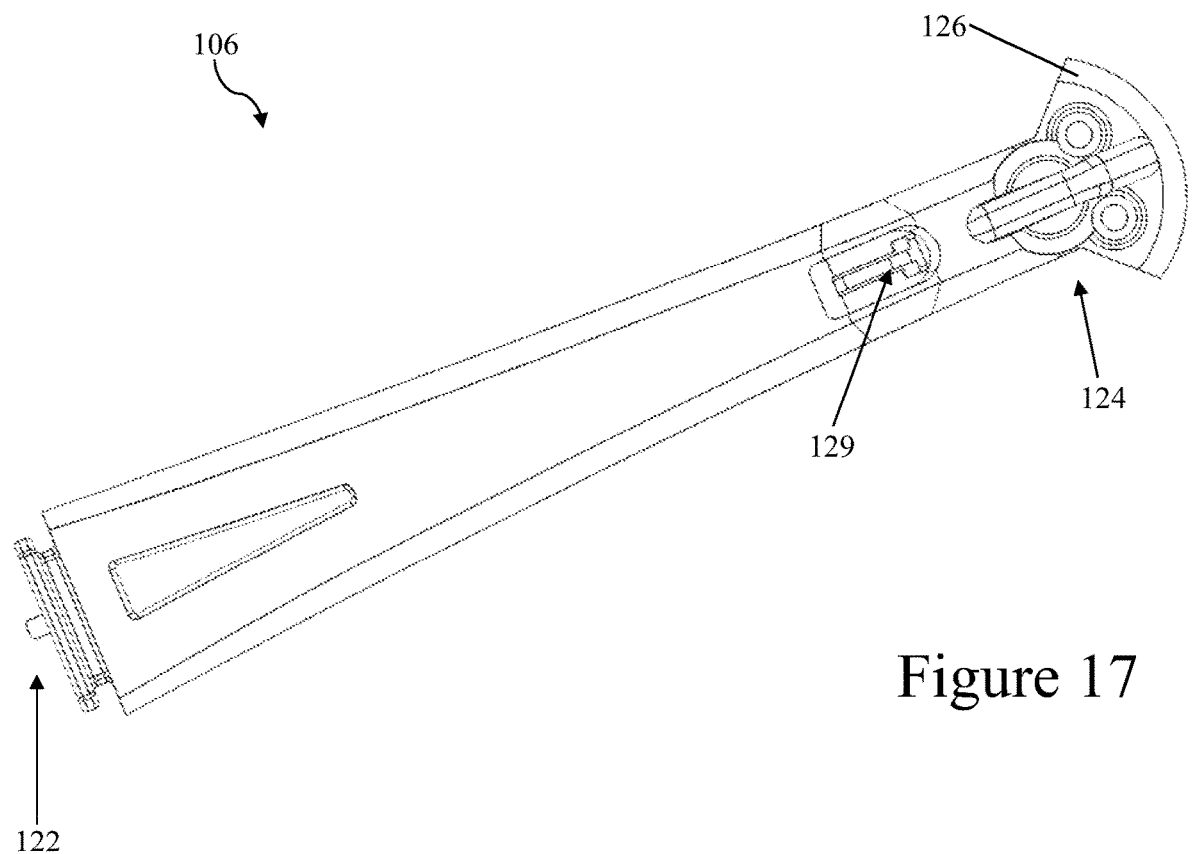
Figure 18:
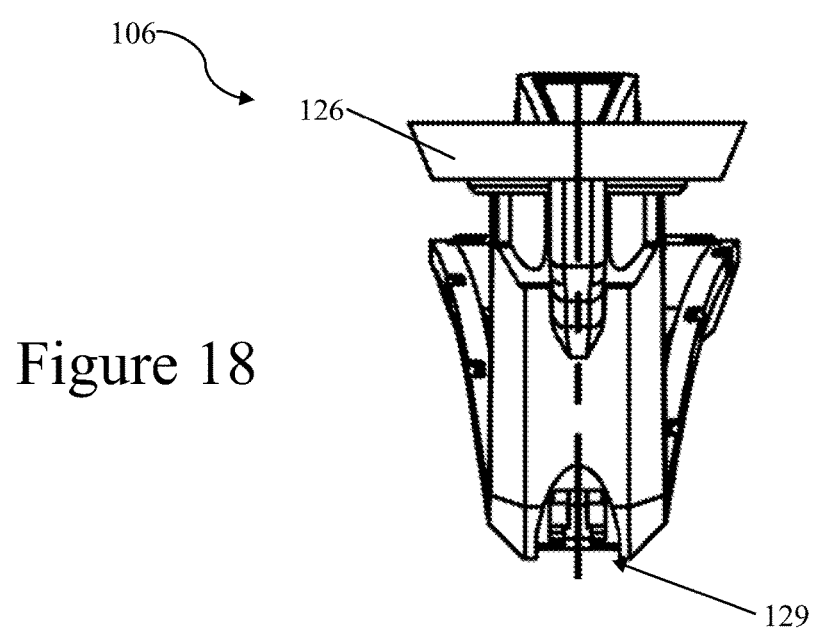
FIG. 18 is an end view from the outboard end of the support member.

As shown in FIGS. 17 and 18, at the outboard end 124, the apex of the first support member 106 may comprise a slot 129. As shown in FIG. 16, the slot 129 at the apex portion of the first support member 106 may be fitted with a light pipe foot 130 that may function as a landing support and or a shock absorber for protecting the model rotor 1000 from impact forces. The motor base 126 may comprise a partially rounded top cross-sectional profile that may be coupled to the portion of the first arm 102 below the first propeller 104 such that the motor base 126 may form the base of the first propeller 104.

Referring to FIGS. 1, 2, 14A, and 14B, the first support member 106 may be provided with an extruded surface 128. The extruded surface 128 may extend through a cut-through portion 111 in the top surface 107 of the first arm 102, when the first arm 102 and first support member 106 are coupled. The extruded surface 128 may be composed of an illuminating material as described above so that a portion of the illuminated first support member 106 may be viewed from above the rotorcraft through opening formed by the cut through portion 111 of the first arm 102.

The extruded surface 128 may be disposed along the side of the first support member 106 to which the first arm 102 couples, protruding upward from the body of the support arm 106. The extruded surface 128 may extend a distance along the length of the first support member 106. The position of extruded 128 may align with the position of the cut through portion 111 of the first arm 102 when the first arm 102 and first support member 106 are coupled.

The extruded surface 128 may be configured to have a perimeter shape substantially coincident with the perimeter shape of the cut through portion 111 of the first arm 102. In the embodiment shown, the cut through portion 111 may have a substantially trapezoidal shaped perimeter. The extruded surface 128 may fit within the opening in the first arm 102 formed by the cut through portion 111. Further, the exposed surface 128 may protrude to a height above the surface of the first support member 106 sufficient to substantially "fill" the opening formed in the first arm 102 by the cut through portion 111.

In alternative embodiments, the quantity, location, perimeter shape, and height of the extruded surface, or surfaces 128, may vary in accordance with the corresponding features of the cut through portion, or portions 111, of the first arm 102, so that the extruded surface 128 may "fill" the opening (s) formed in the first arm 102 by the cut through portion(s) 111.

The first support member 106 may have an outer cross section configured to mate to the first arm 102 along the length of each component. The outer cross section size of the first support member 106 may be sized to fit within, and extend into, the downwardly facing open end of the first arm 102 formed by the inner surface of the outer cross section of the first arm 102.

Figure 15:
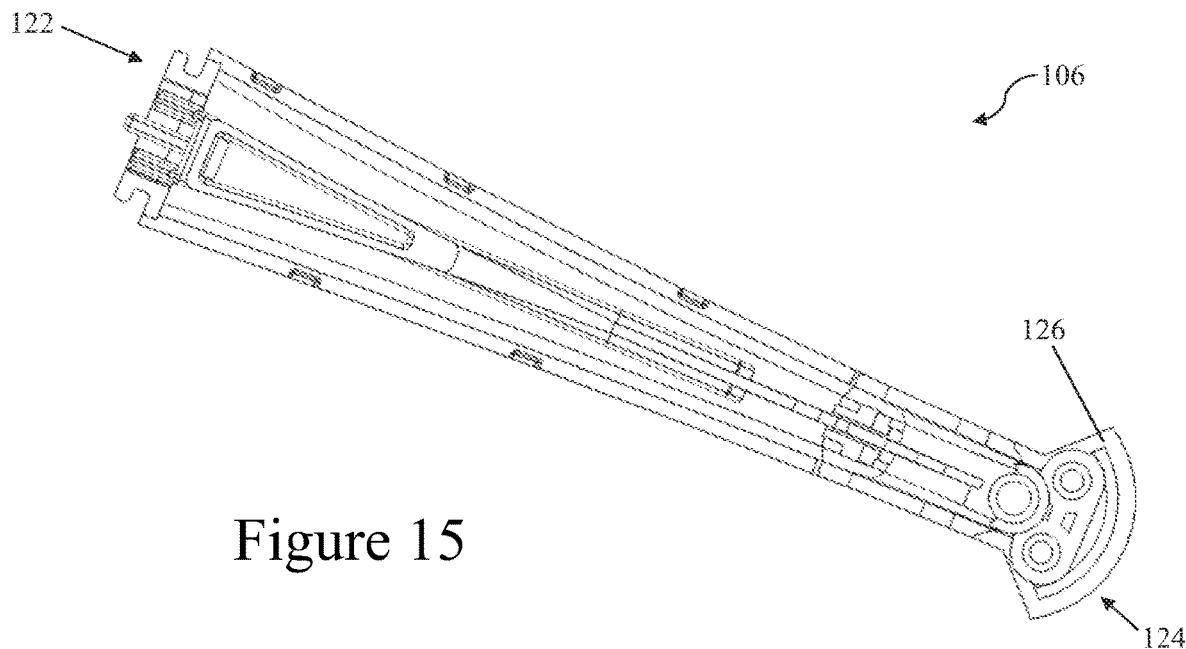
FIGS. 15-17 are top, side, and bottom views, respectively, of a support member.

Viewing the first support member 106 from above, as shown in FIG. 15, and below, as shown in FIG. 16, the first support member 106 may be curved along each side, whereby the first support member 106 may be thinner at the outboard end 124 prior to forming the motor base 126 and wider at the inboard end 122. Alternatively, the first support member 106 may be straight along each side, but tapered towards the outboard end 124, whereby the first support member 106 may be thinner at the outboard end 124 prior to forming the motor base 126 and wider at the inboard end 122. In an alternative embodiment, the first support member may have a substantially uniform width along its length, or, may widen along its length such that the outboard end 124 is wider than the inboard end 122.

Figure 11:
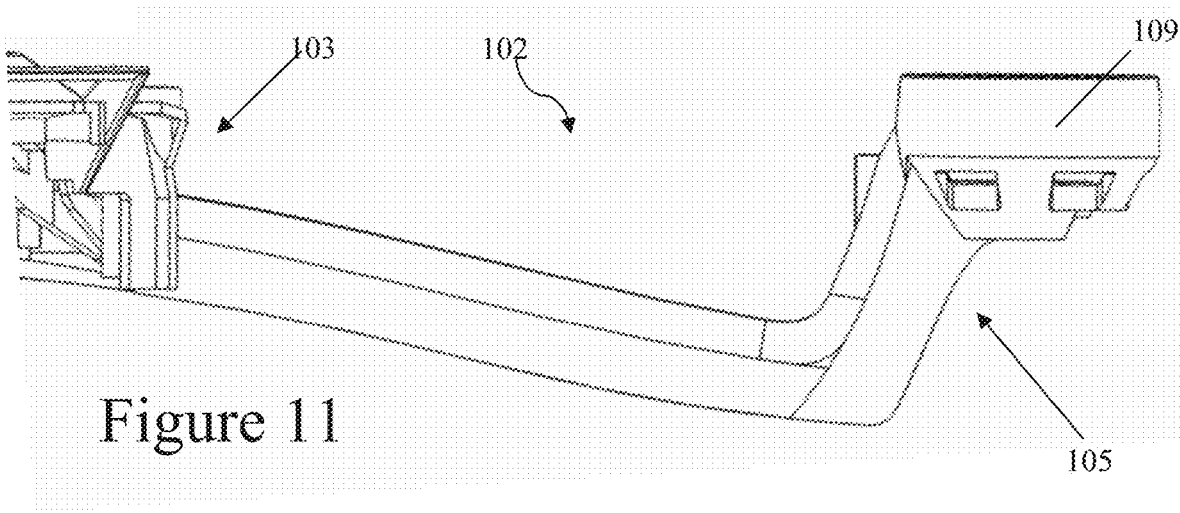
Figure 12:
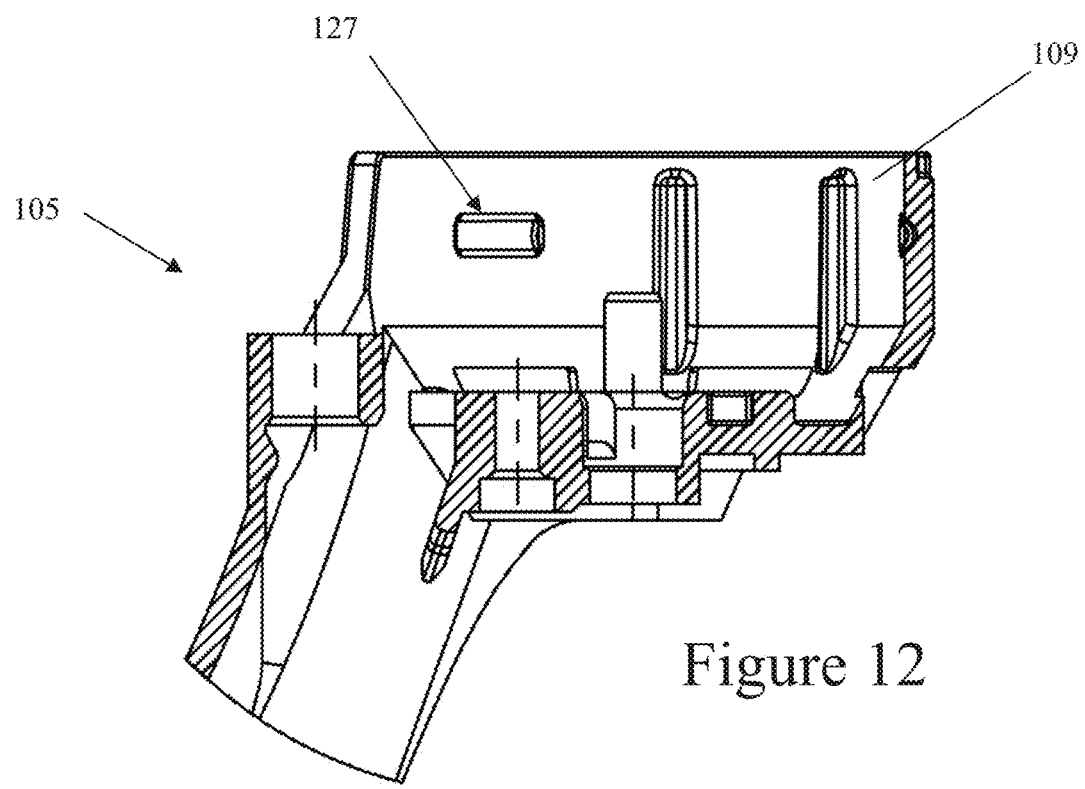
FIGS. 12 and 13 are a side and top view, respectively, of a motor pod.
Figure 13:
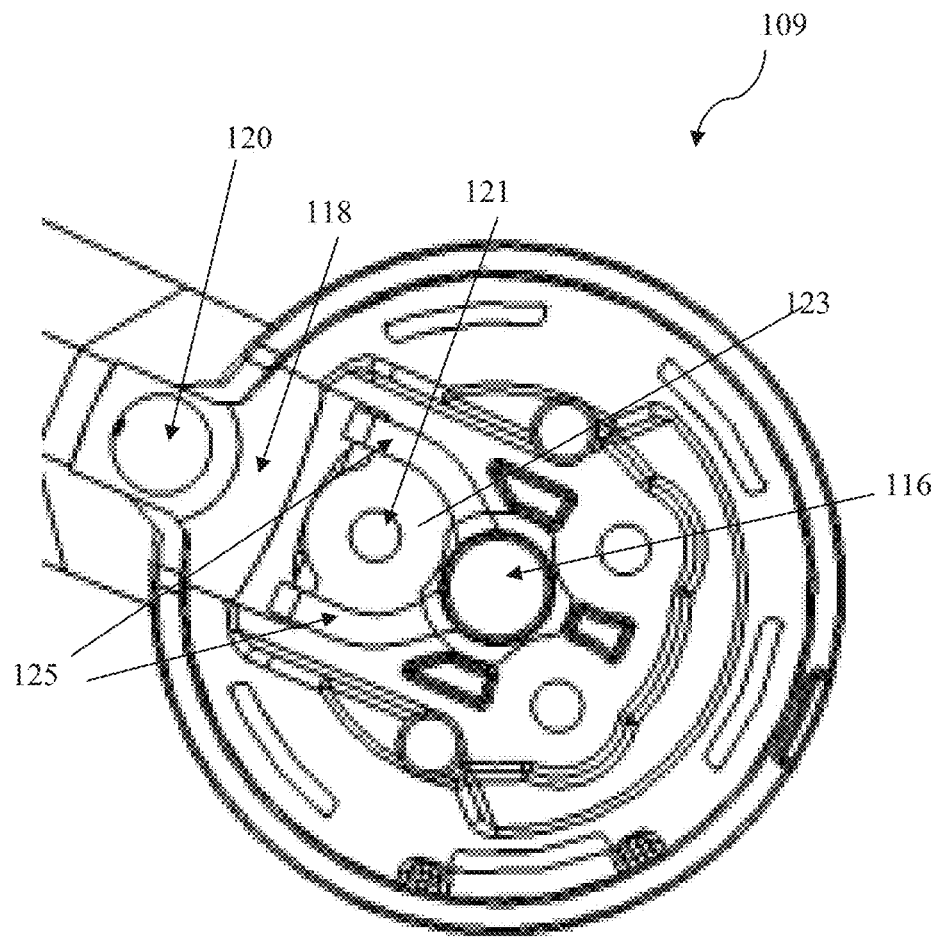

The profile shape of the support member 106 may be substantially similar to the profile shape of the first arm 102 shown in FIGS. 10 and 11 described above. The first support member 106 profile width may be sufficiently less than that of the first arm 102 along the length of each component, allowing for the first support member to be slid into and mate with the first arm 102.

The first support member 106 may be removably coupled to the first arm 102. The first support member 106 may comprise features that may correspond to the retaining clips 134, 136 in the first arm 102. As shown in FIGS. 13-16, there may be five indentions along the edges of the support arm 106 that may mate with the retaining clips 134, 136 to aid in coupling the first support arm 106 to the first arm 102. The first support member 106 may structurally support the first arm 102 against displacement from flexing or twisting that may result from acceleration or impact during operation of the rotorcraft 1000. The coupled first arm 102 and first support member 106 may exhibit increase stiffness along the length of the rotary assembly 100 and provide for more stable flight of the rotorcraft 1000. Additionally, the coupled first arm 102 and first support member 106 partially enclose rotary assembly components, such as any wires that may be within wire channels 132A, 132B.

Motor Rings Structure

Figure 23:
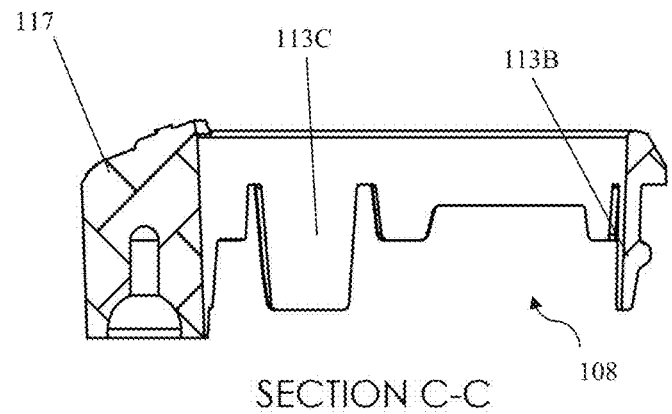
Figure 24:
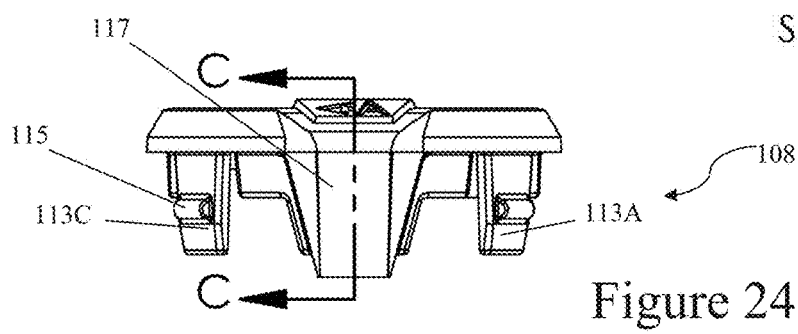

Turning to FIGS. 19-24, the perimeter of the top portion of the motor pod 109 may be affixed with a motor ring 108. As shown in FIGS. 19, 23, and 24, the motor ring 108 may comprise retaining tabs 113A-C that may contact the interior surface of the motor pod 109 to secure the motor ring 108 over the motor pod 109. The retaining tabs 113A-C may each comprise a detent 115 that may secure the motor ring 108 by snapping into a corresponding tab recess 127 (shown in FIGS. 12 and 29) in the motor pod 109. The retaining tabs 113A-C secure the motor ring 108 by compressing against the interior surface of the motor pod 109 and interlocking the detents 115 within the tab recesses 127 in the motor pod 108. Alternatively, the quantity, location, size, and shape of the tab recesses 127 in the motor pod 109 may vary in accordance with the corresponding features of the retaining tabs 113 on the motor ring 108. The motor ring 109 may also comprise a trapezoidal shaped covering tab 117 extending from the outer perimeter of the motor ring 109. The covering tab 117 may be sized to fit over the transition region between the first arm 102 and the motor pod 109, and cover the second bulb opening 120 at the outboard end of the first arm 102. As shown in FIG. 23, the covering tab 117 has a rounded cutout from the bottom that may be sized to fit the tip of an LED bulb, for example.

Figure 20:
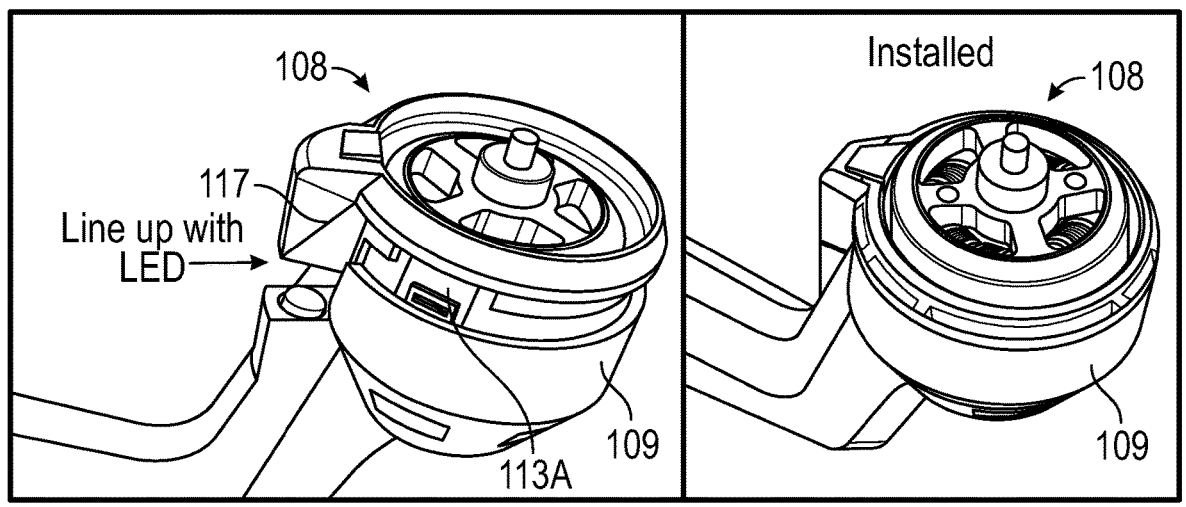
FIG. 20 is a perspective view of a motor ring being assembled on an arm.
Figure 21:
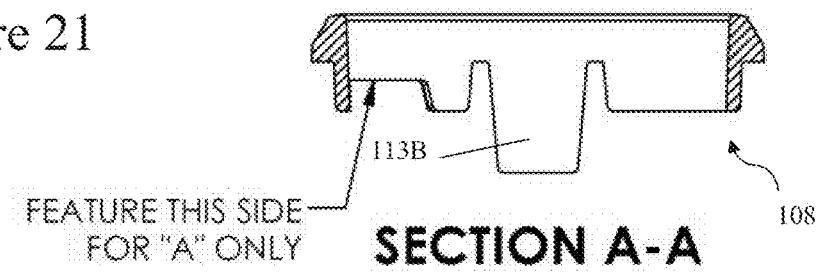
FIGS. 21-24 are sectional views of a motor ring.
Figure 22:
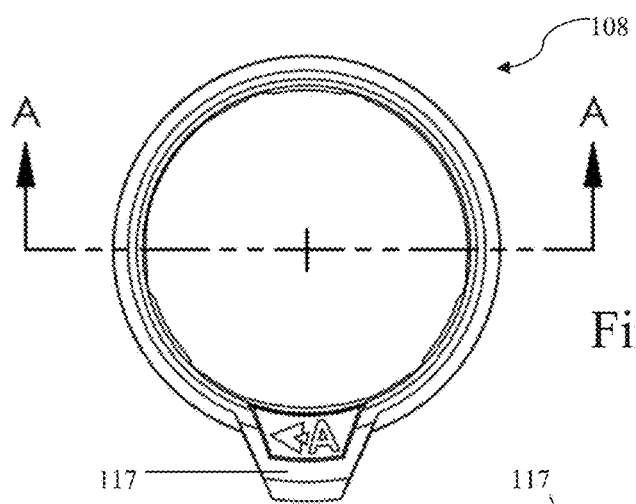

The shape and circumference of the motor ring 108 may be sized to be substantially the same as the circumference of the motor pod 109. The retaining tabs 113A-C may be formed at a position slightly within the circumference of the motor pod 109 to fit inside the motor pod 109. The interior opening of the motor ring 108 may be sized to fit around the motor of the first propeller 104. As shown in FIG. 20, the motor ring 108 may be fitted over the motor pod 109 and snapped in place.

In an embodiment, the motor ring 108 may comprise a piece of semi-rigid or rigid material that may be transparent or semi-transparent and capable of distributing light received from a light source 512 substantially throughout its volume, illuminating the surfaces of the transparent or semi-transparent material. For example, the motor ring 108 may be made from an acrylic, polycarbonate, or other like material.

Light Pipe Function

In the embodiment shown and described above, the support members 106, 206, 306, 406 and the motor rings 108, 208, 308, 408 may be both removably coupled to the rotorcraft 1000 and be configured to function as a light pipe, capable of illuminating along the outer surfaces of the support members 106, 206, 306, 406, the outboard end of the arms 102, 202, 302, 402, the base of the motor pods 108, 208, 308, 408, and the top circumference of the motor pods 108, 208, 308, 408 when receiving light from a light source 512.

The rotorcraft 1000 may further be implemented with a support member color arrangement configurable by the user through removal and replacement of an undesired support member with one having the desired color characteristics at each rotor assembly. For example, a user may configure both forward facing support members of rotorcraft 1000 to illuminate red by replacing the forward facing support members with support members configured to illuminate red in response the light received from the light source 512. Users may configure the light arrangement in accordance with their color preference. The configurable light pipe feature may allow for the rotorcraft 1000 to be easier to fly in low visibility settings, such as in the evening, or in an indoor environment, and may also aid the user by allowing the orientation of the rotorcraft to be easily discerned, based on the support member color configuration, during flight. The ability to determine orientation of the rotorcraft 1000 may be further enhanced by the cut through portion 111 of the first arm, through which the illuminated light from the support member below may be seen.

With the color configuration viewable from the top and bottom of the rotorcraft 1000, the orientation may be determined by the user while performing tricks during flight that may cause the rotorcraft to be in an inverted position, as well as in settings where the user may operate the rotorcraft 1000 from an elevated position.

The first support member 106 may further be configured to provide aesthetically pleasing lines and features. For example, when the first support member 106 is mated with the first arm 102, the first support member 106 may be shaped to have a curvature that follows or complements the curvature of the first arm 102 and the curvature of the center pod assembly 500.

Figure 38:
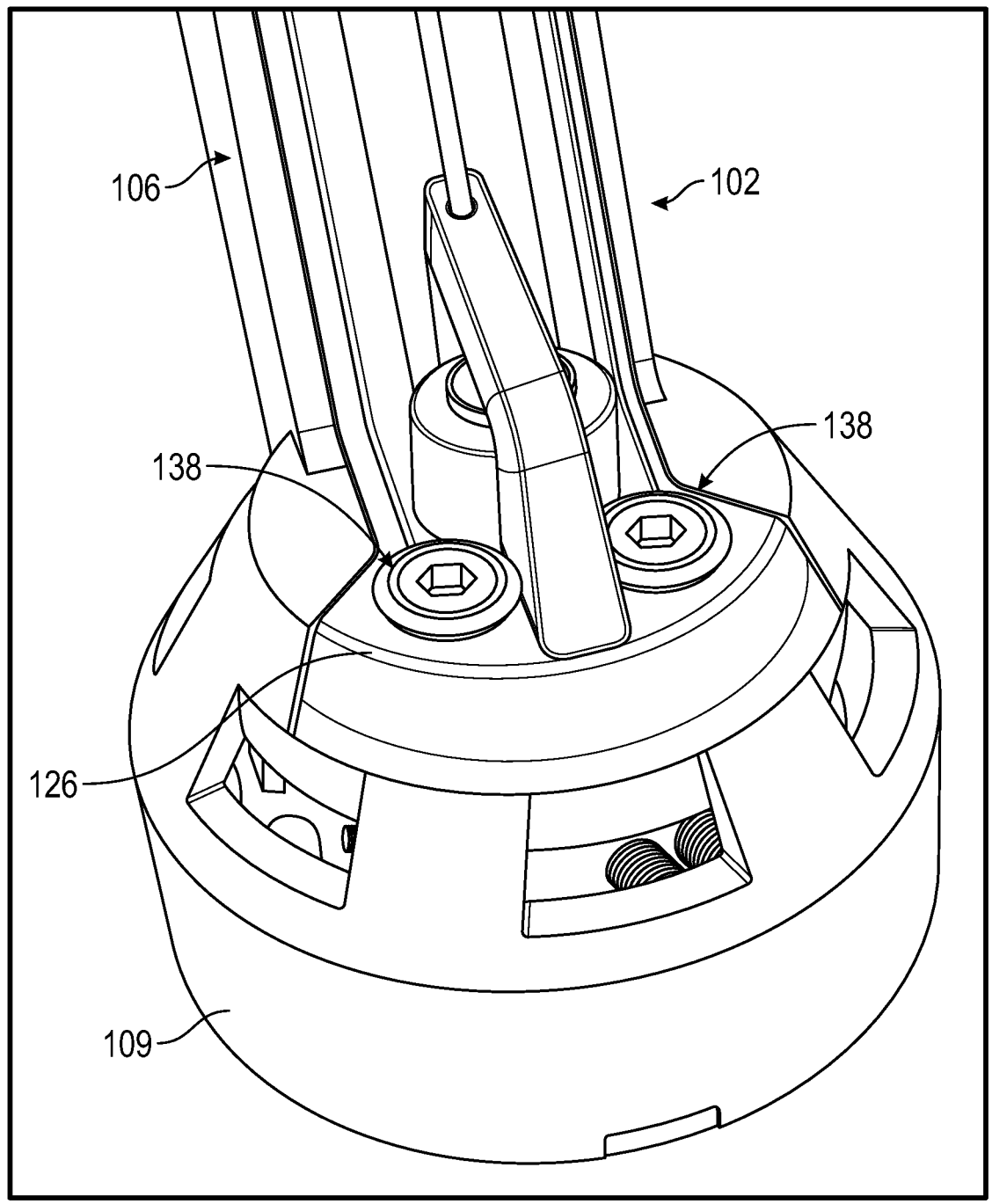
FIG. 38 is a perspective view of the motor base of the support member being coupled to the arm and motor pod.

As shown in FIG. 38, the first support member 106 may be coupled to the underside of the first arm 102. The motor base 126 of the first support member 106 may be secured to the base of the motor pod 109 by two mechanical fasteners 138

LED Harness

Figure 25:
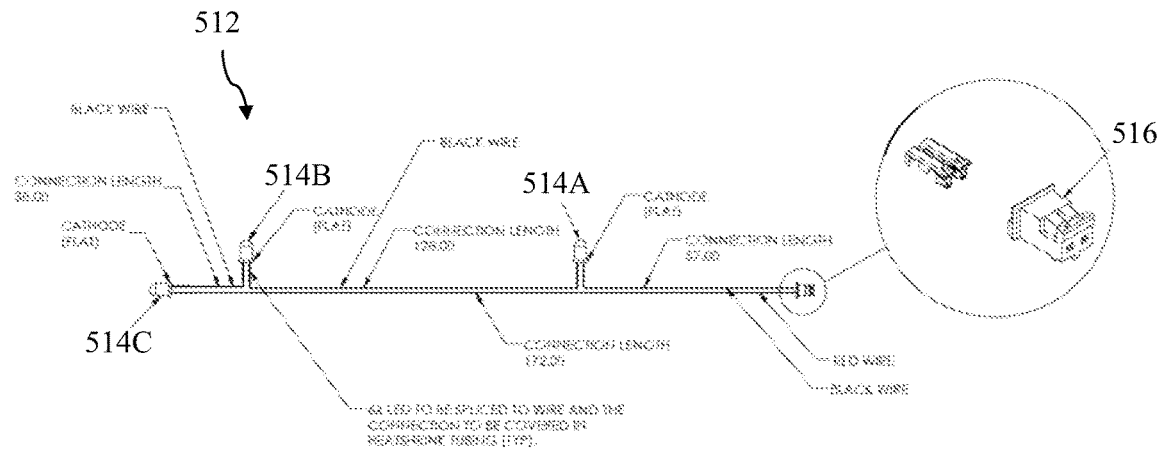
FIG. 25 is a view of an LED harness with an enlarged view of the plug.
Figure 26:
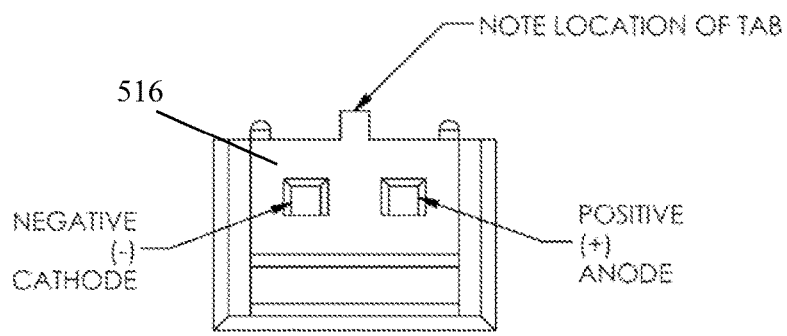
FIG. 26 is another enlarged end view of the plug.
Figure 27:
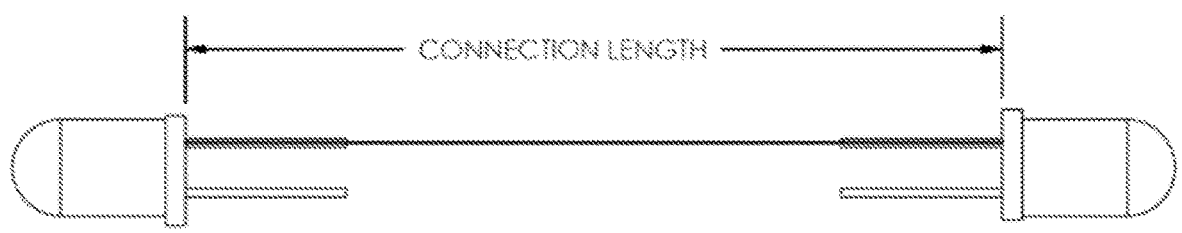
FIG. 27 is a view of the connection between the LED's on the LED harness.
Figure 28:
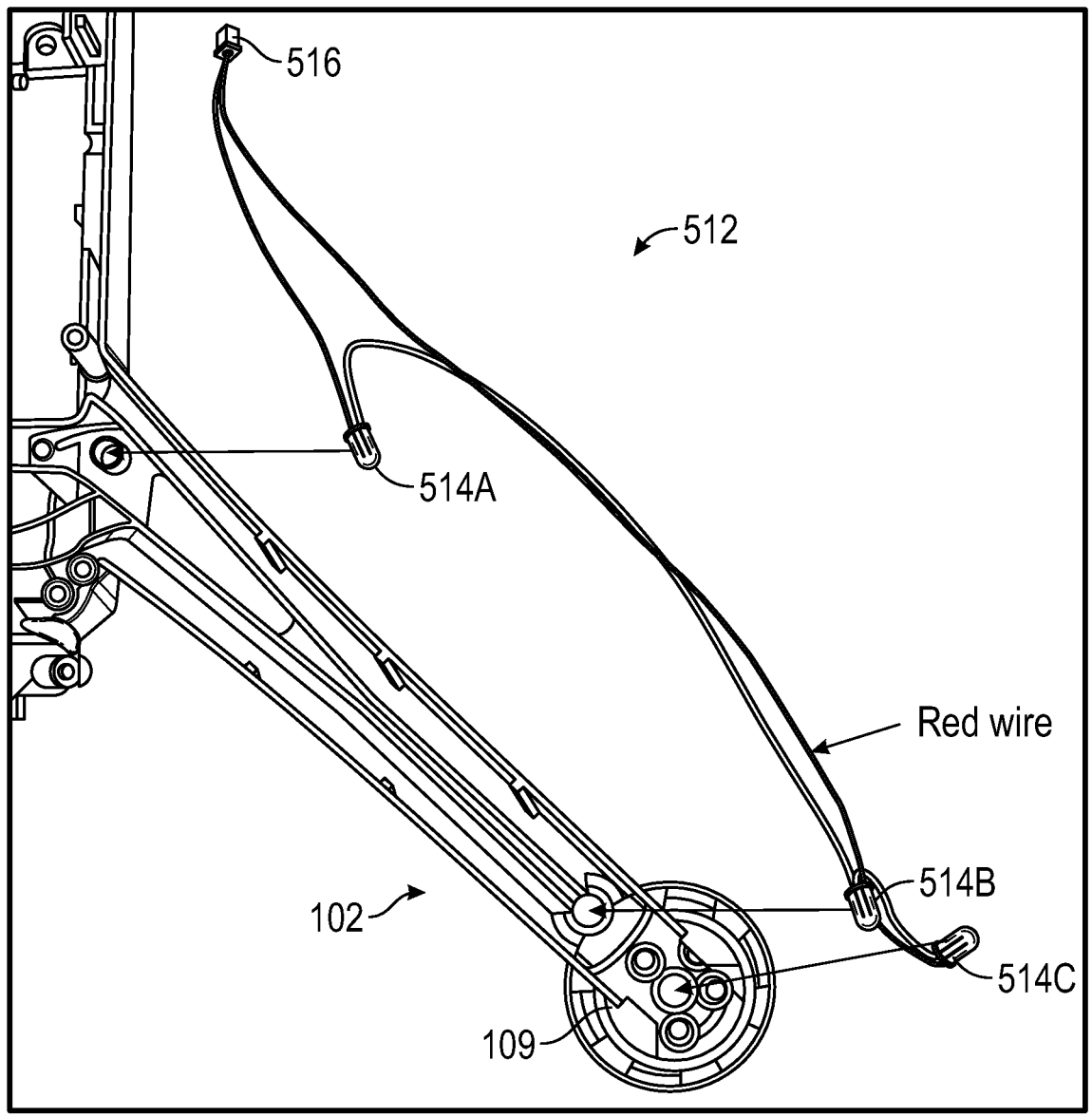
FIG. 28 is a view of the LED harness positioned next to an arm of the chassis.
Figure 37:
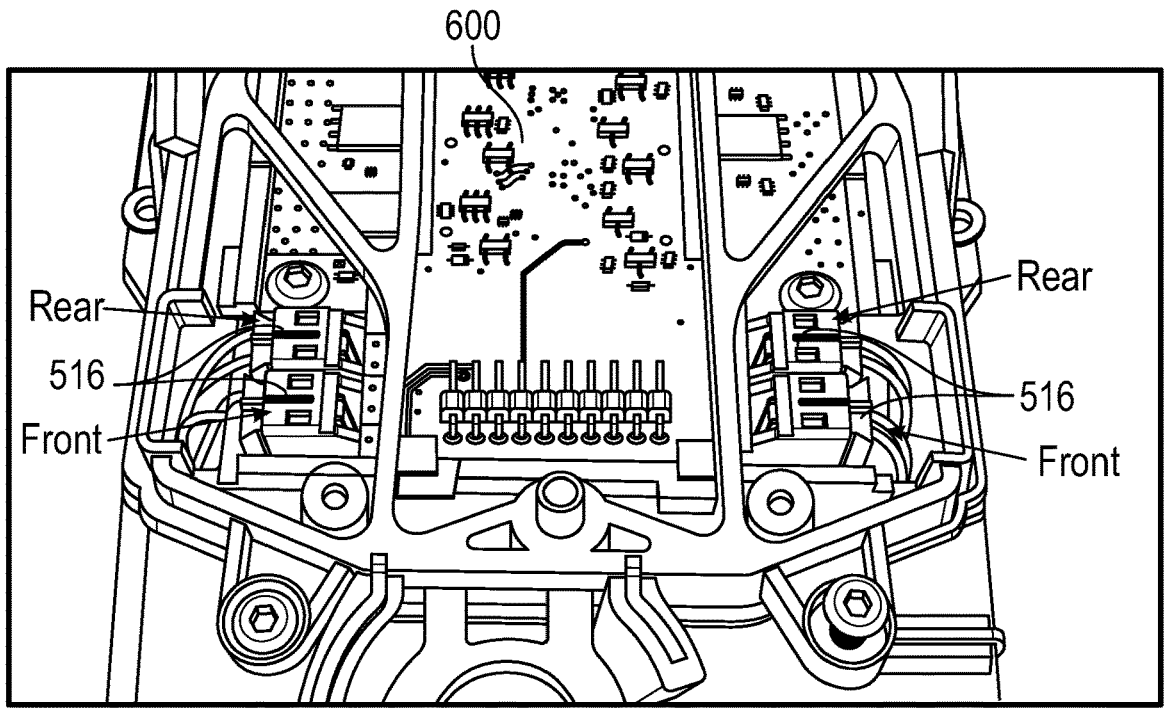
FIG. 37 is a top view of the chassis showing the plugs from the LED harnesses being plugged into the ESC board.

In an embodiment, the light source 512 may be a light emitting diodes (LED) harness 512 positioning LED bulbs 514 within the motor pod 109 and the first arm 102 of the first rotor assembly 100 to illuminate the support member 106 and the motor ring 108. Each of the rotor assemblies 100, 200, 300, 400 may be illuminated by a separate LED harness 512. Alternatively, a single LED harness may be used instead to illuminate all four rotor assemblies 100, 200, 300, 400 together. In the embodiment shown in FIG. 25, the LED harness 512 may comprise three LED bulbs 514a-c and a plug 516 that may all be electrically coupled together via a plurality of black and red wires. The wires may be colored to aid in identifying the cathode and anode terminals of the plug 516 and LED bulbs 514a-c. As shown in FIGS. 25 and 28, connections with the cathode terminals of the LED bulbs 514a-c, including the connections between the anode terminal of the plug 516 and the cathode terminal of bulb 514a, the anode terminal of LED bulb 514a and the cathode terminal of another LED bulb 514b, and the anode terminal of LED bulb 514b and the cathode terminal of LED bulb 514c, may all be made via a black wire. The connection between the anode terminal of the LED bulb 514c and the cathode terminal of the plug 516 may be made via a red wire. The plugs 516 may also each be colored red or black to identify whether the specific harness 512 the plug connects may be illuminating either one of the two front rotor assemblies 100, 200, or one of the two rear rotor assemblies 300,400. As shown in FIG. 37, the plugs 516 of the harnesses 512 for the front rotor assemblies 100, 200 may be colored red. The plugs 516 of the harnesses 512 for the rear rotor assemblies 300, 400 may be colored black. The colored plugs may also aid the user during assembly or servicing when plugging the harness plugs 516 into the ESC board 600.

In the embodiment shown, each of the LED bulbs 514A-C of the LED harness 512 may be installed in the first arm 102, with the wires of the harness 512 routed from the first arm 102 through the chassis 502 and then plugged into the ESC board 600. As shown in FIG. 28, LED bulb 514C may be installed in the motor pod 109, LED bulb 514B may be installed at the outboard end 104 of the first arm 102 near the transition region between the first arm 102 and the motor pod 109, and the LED bulb 514A may be positioned at the inboard end 103 of the first arm 102.

Figure 29:
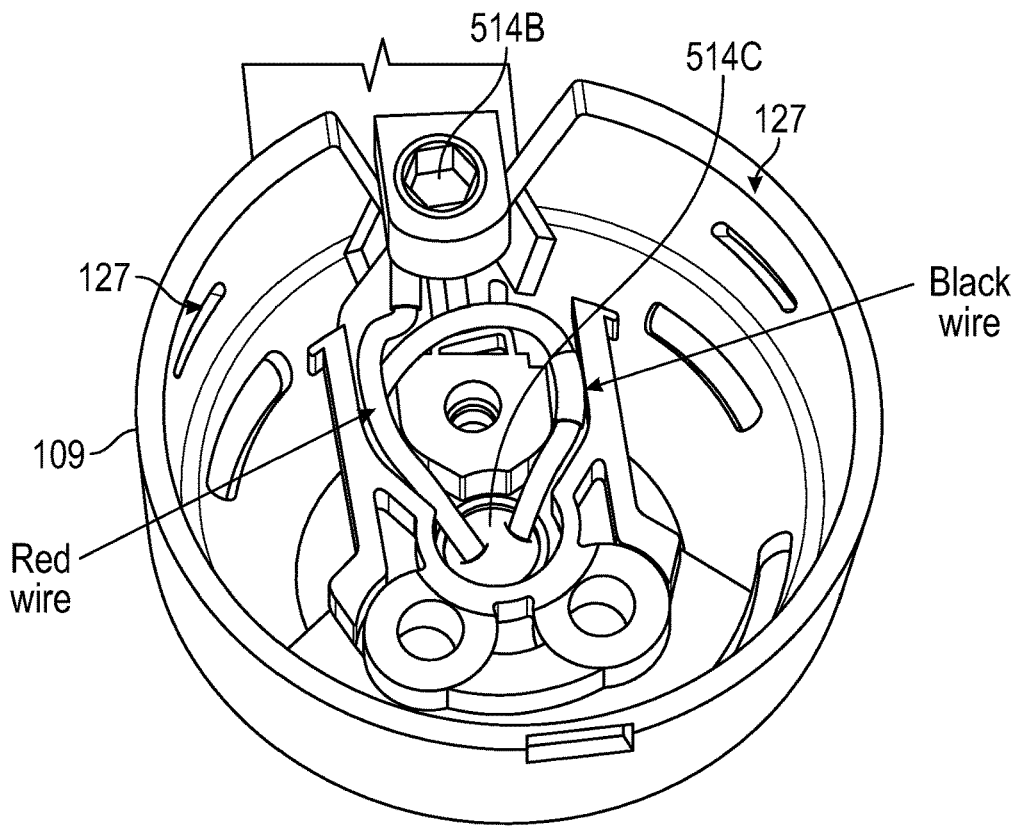
FIGS. 29-31 are views of the LED harness being installed on the motor pod.
Figure 30:
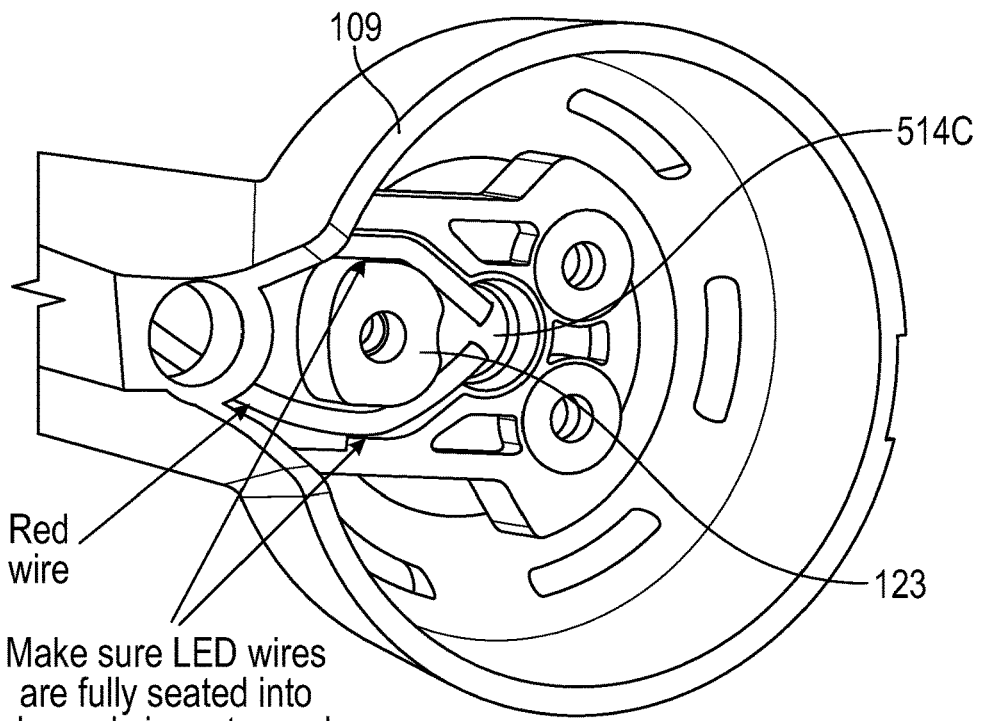

As shown in FIGS. 29 and 30, LED bulb 514C may be positioned in the bulb opening 116 with the LED bulb 514C pointing downwards out of the base of the motor pod 109. Each of the black and red wires connected to the bulb 514C may be seated, respectively, in one of the two wire grooves 125 extending from the bulb opening 116 towards the wire opening 118. The supporting boss 123 between the two wire grooves 125 may temporarily part the wires connected to the LED bulb 514C as each wire is routed around a portion of the supporting boss 123 within the wire grooves 125. The two wires extending from the LED bulb 514C may then be routed through the wire opening 118 to the underside of the first arm 102.

Figure 31:
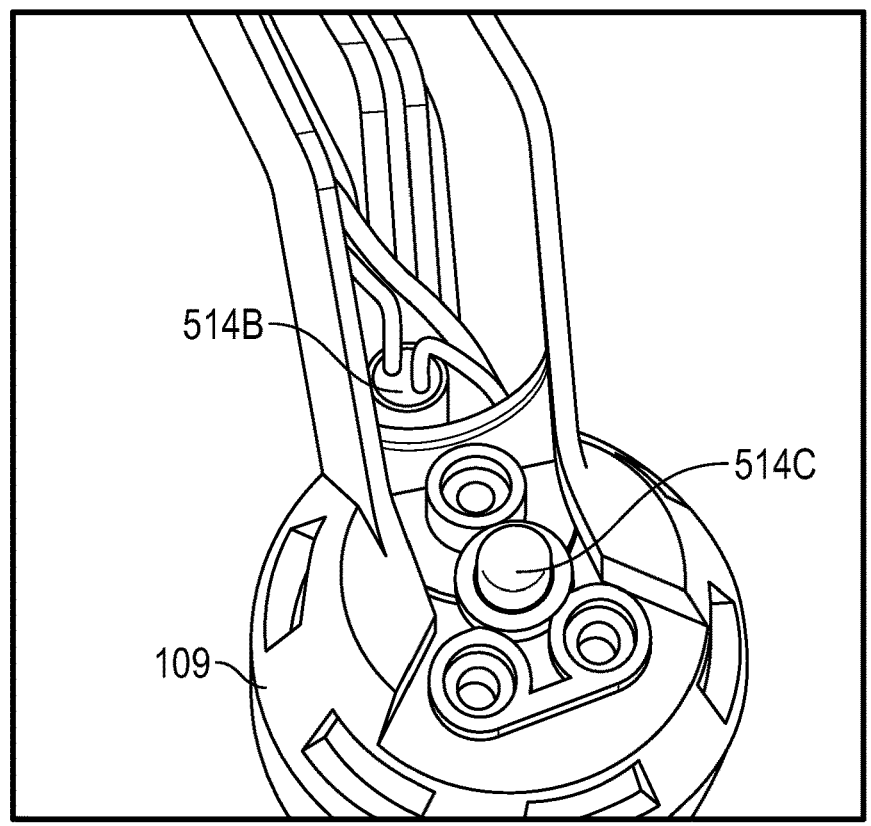

Turning to FIG. 31, with the harness 512 routed through the wire opening 118, the LED bulb 514B connected to the LED bulb 514C may be positioned in the second bulb opening 120 at the outboard end of the first arm 102. LED bulb 514B may be positioned in the second bulb opening 120 in the opposite direction as LED bulb 514C. Led bulb 514B may be positioned from the underside of the first arm 102 pointing upwards through the second bulb opening 120.

Figure 33:
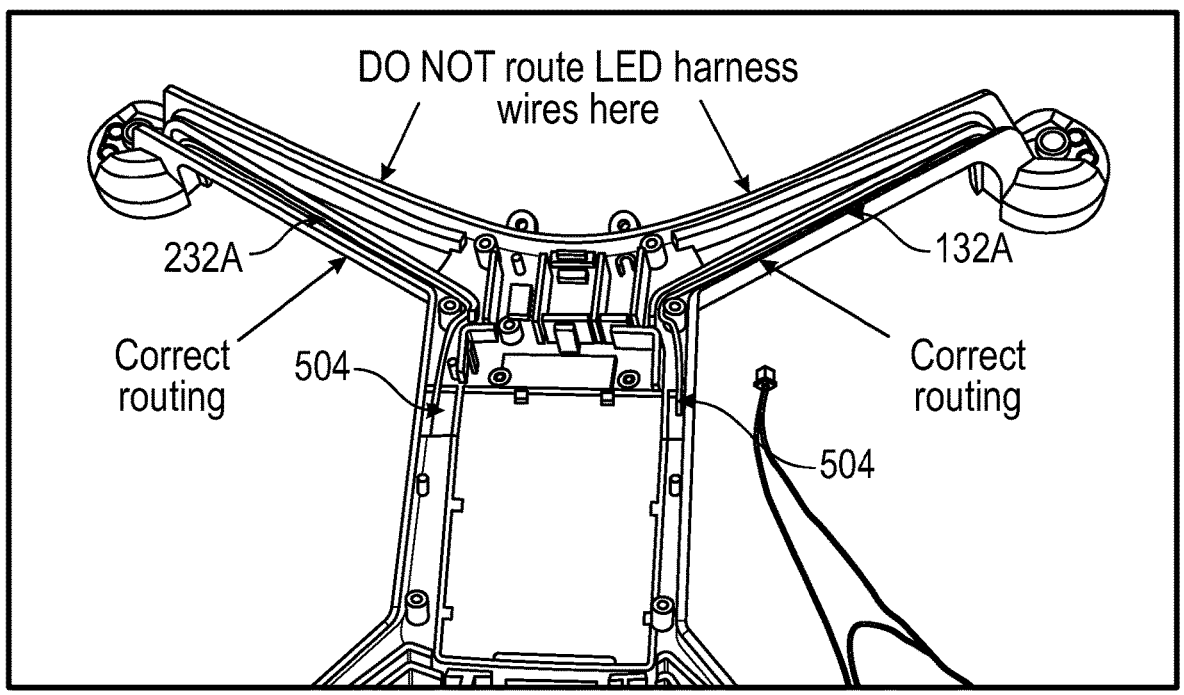
FIG. 33 is a top view of the routing of the LED harness from the motor pod to the chassis.

With LED bulbs 514B and 514C installed on the first rotor assembly 100, both of the wires of the harness 512 may then be routed towards inboard end of the first arm 102 along the underside of the first arm 102. Both wires may be routed through one of the respective wire channels 132A on the underside of the first arm 102. Wire channel 132A may be closer to one of the longer sides of the chassis 502, respectively, and may lead towards a harness opening 504 on the respective side of the chassis 502, as shown in FIG. 33.

Figure 32:
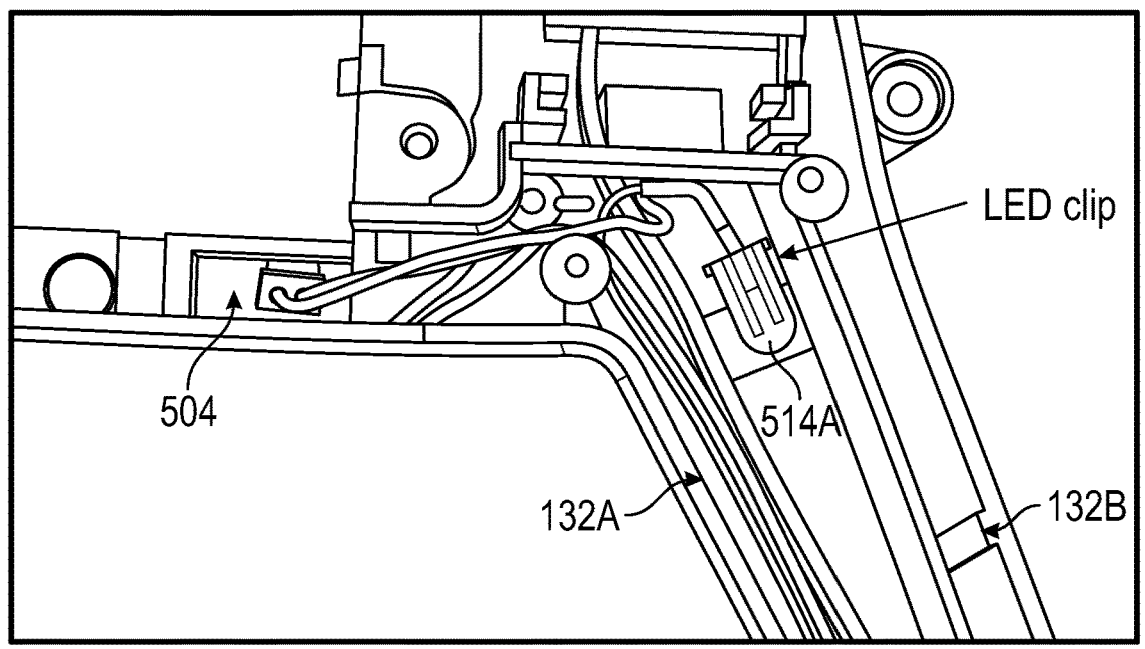
FIG. 32 is a view of the LED harness being installed at the inboard end of an arm.
Figure 34:
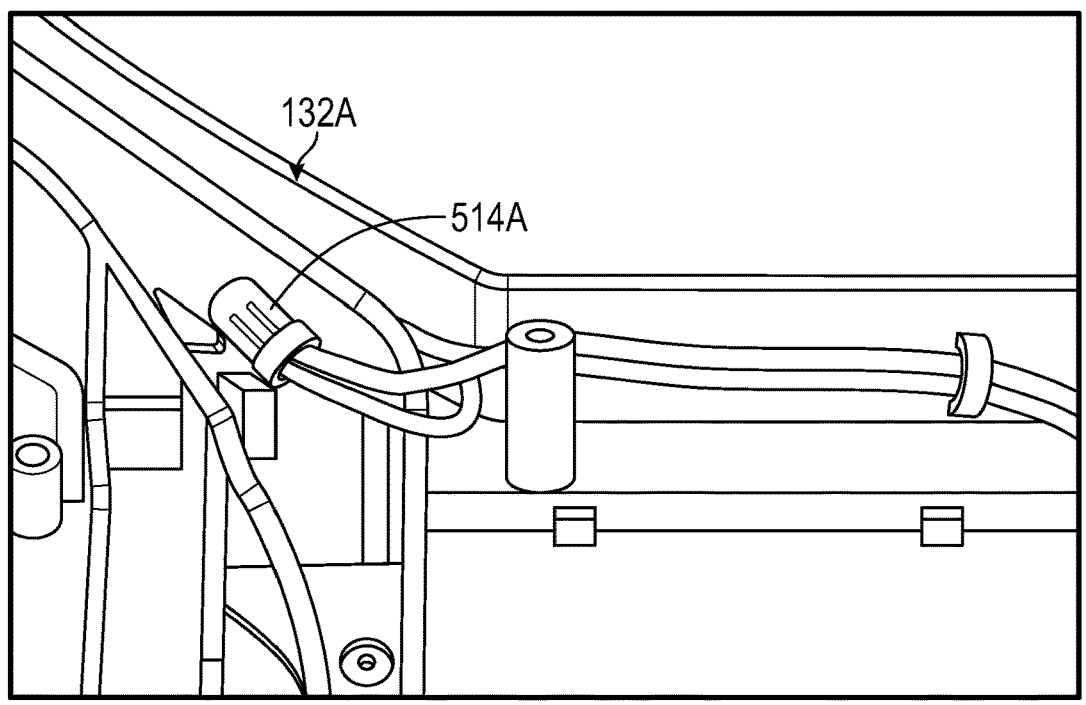
FIGS. 34 and 35 are views of the LED harness being routed from the arm to the chassis.
Figure 35:
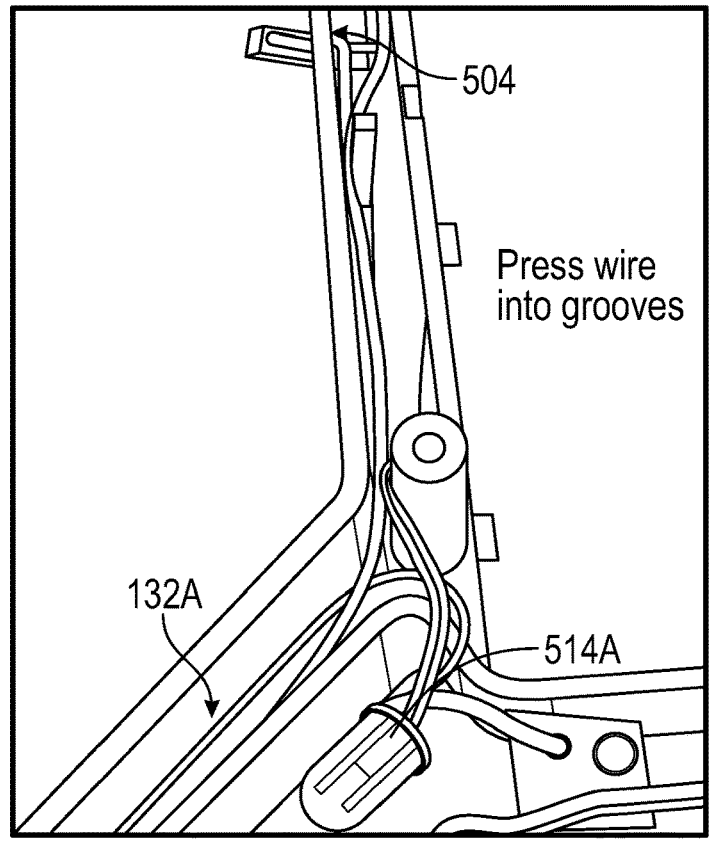
Figure 36:
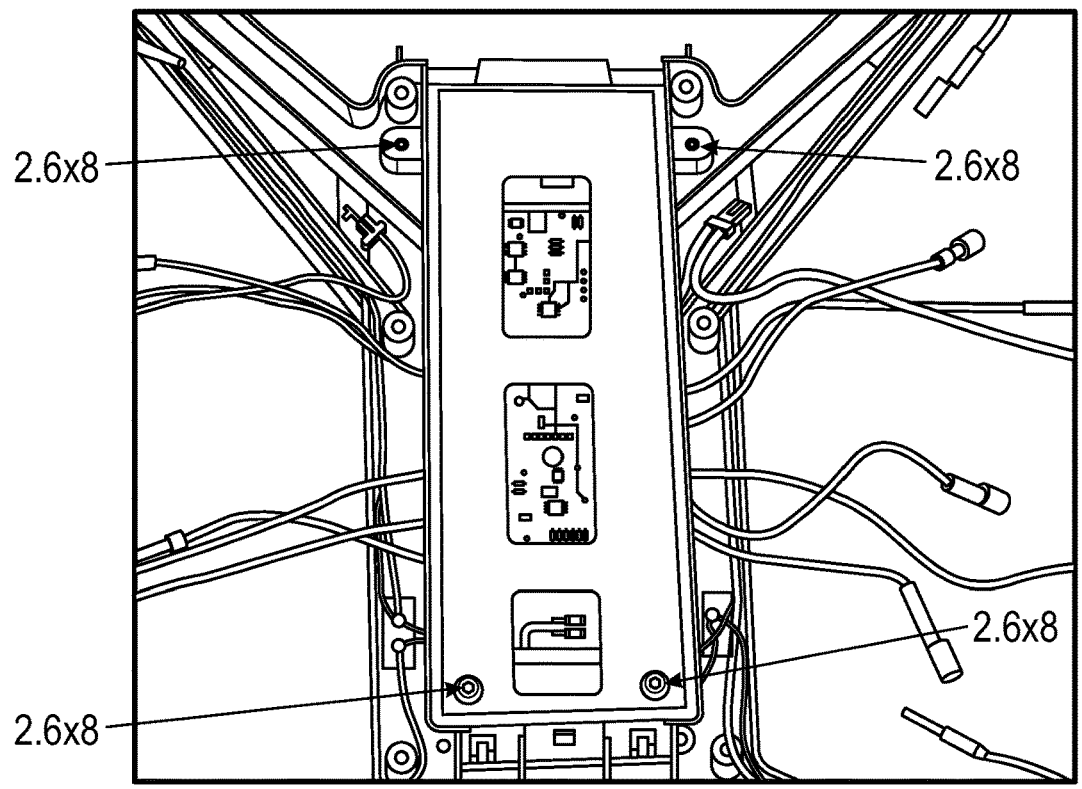
FIG. 36 is a bottom view of the chassis and the wires from the ESC board to be connected to the motors.

Turning to FIG. 32, as both wires are routed towards the inboard end 103 of the first arm 102, LED bulb 514A may then be positioned in a gap at the inboard end 103 of the first arm 102 between the two wire channels 132A and 132B. LED bulb 514A may be positioned pointing outwards down the length of the first arm 102. The LED bulb 514A may be secured by a LED clip positioned in the gap between the two wire channels 132A and 132B. Once LED bulb 514A is secured, the remaining wires of the harness 512 and the plug 516 may then be routed along the side of the chassis 502 as shown in FIGS. 33 and 34. The wires may be secured in grooves along the edge of the chassis 502. Plug 516 may then be fitted through the opening 504 in the chassis 502 on the same side of the chassis 502 as the arm 102, to the top side of the chassis 502. The plug 516 of the LED harness 512 may then be plugged into the ESC board 600, as shown in FIG. 37. As shown in FIG. 36, the ESC board 600 may be installed on the bottom side of the chassis 502 and secured by four fasteners 506.

In alternative embodiments, the light source 512 may comprise an incandescent lamp, electroluminescent lamp, gas discharge lamp, laser, or the like.

Varied Wire Lengths

Figures 39, 40:
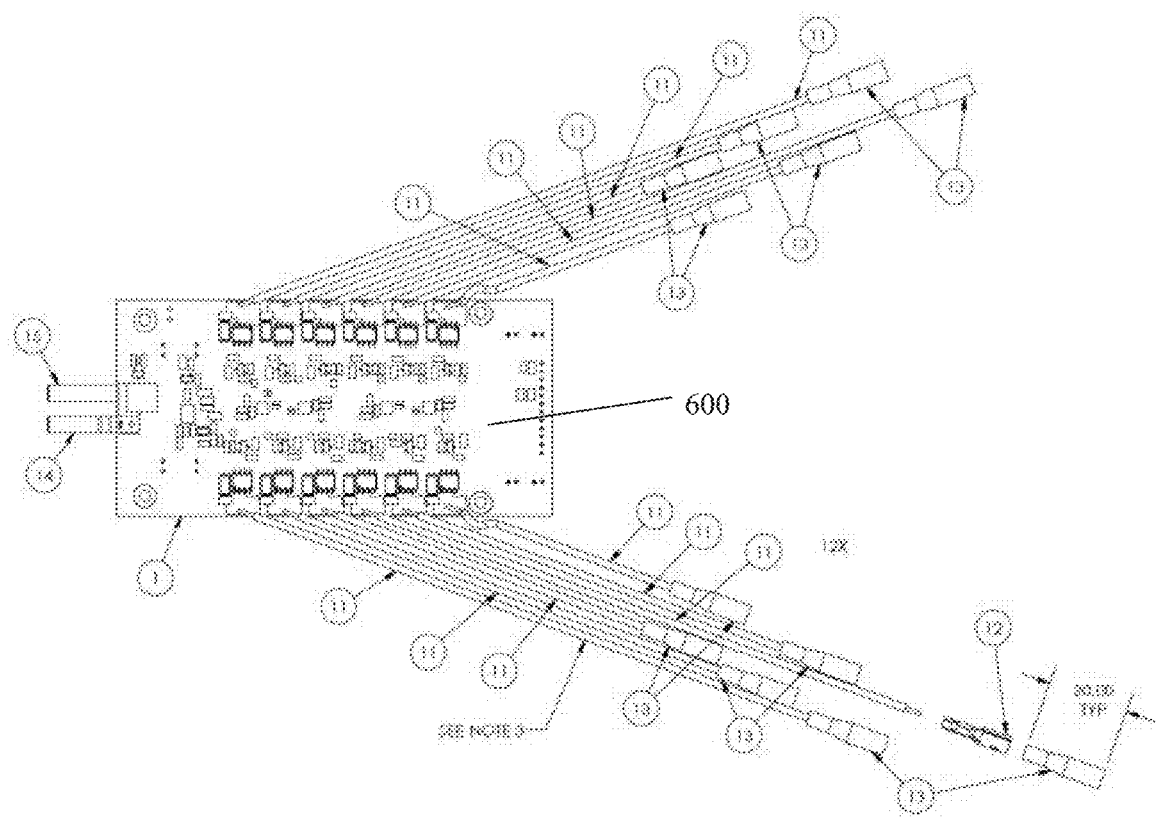
FIG. 39 is a top view of the wires from the ESC board for connecting to the motors.
FIG. 40 is a perspective view of a motor.

Turning to FIGS. 36, 39 and 40, the motor 101 and the ESC board 600 may be connected by a set of three wires with opposite male and female connectable ends extending from each of the motor 101 and the ESC board 600, respectively. FIGS. 36 and 39 show the ESC board 600 with 12 wires with female connector heads capable of connecting to the male connector heads of four motors 101, 201, 301, 401 with three wires each. Alternatively, the connector heads between wires from the motor 101 and the ESC board 600 may be interchanged. There may also be no connector heads at all with wires directly connecting the ESC board 600 to each of the motors 101, 201, 301, 401 of the model rotorcraft 100.

Figure 41:
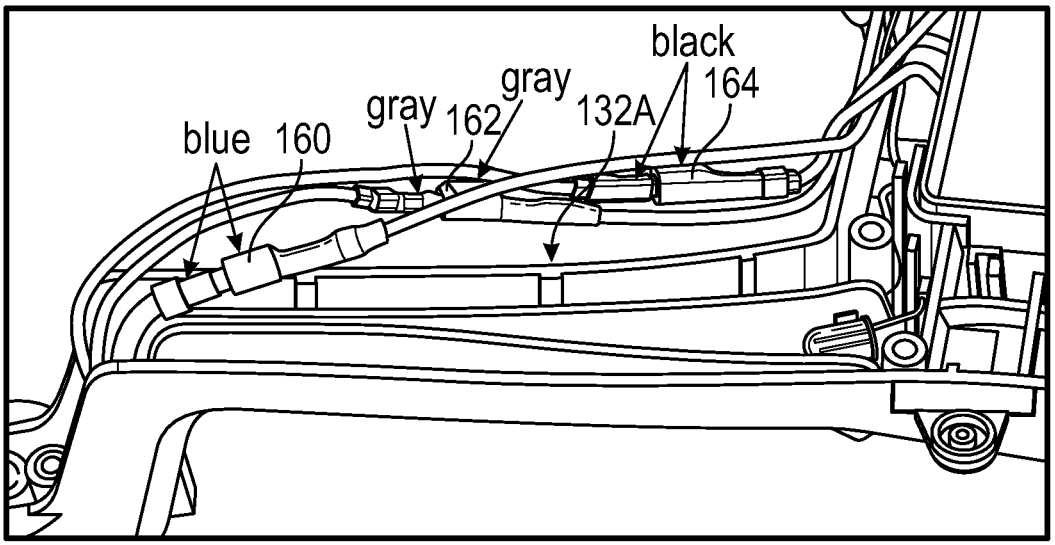
FIG. 41 is a view of the wires from the ESC board connecting with the wires from the motor.

Each of the specific wires extending from the ESC board 600 and the wires extending from the motor 101 may be of varying length to allow the connection of the connector heads to be spaced out through the routed wire channel 132 A, B in the first arm 102. As shown in FIG. 39, a set of three wires of varying length may be allocated for each of the motors 101, 102, 103, 104, to be connected to the ESC board 600. With the motor 101 loaded in the motor pod 109, the three male connector wires from the motor 101 may be routed through the same path as the wires of the LED harness 512 to connect with three female connector wires from the ESC board 600. As shown in FIG. 41, the varying of the wire lengths may allow the wire head connections 160, 162, 164, which may be considerably bulkier then the wires themselves to be spread out along the first arm 102. This may reduce the overall cross sectional area utilized by the wires required to connect the ESC board 600 to motor 101.

Figure 42:
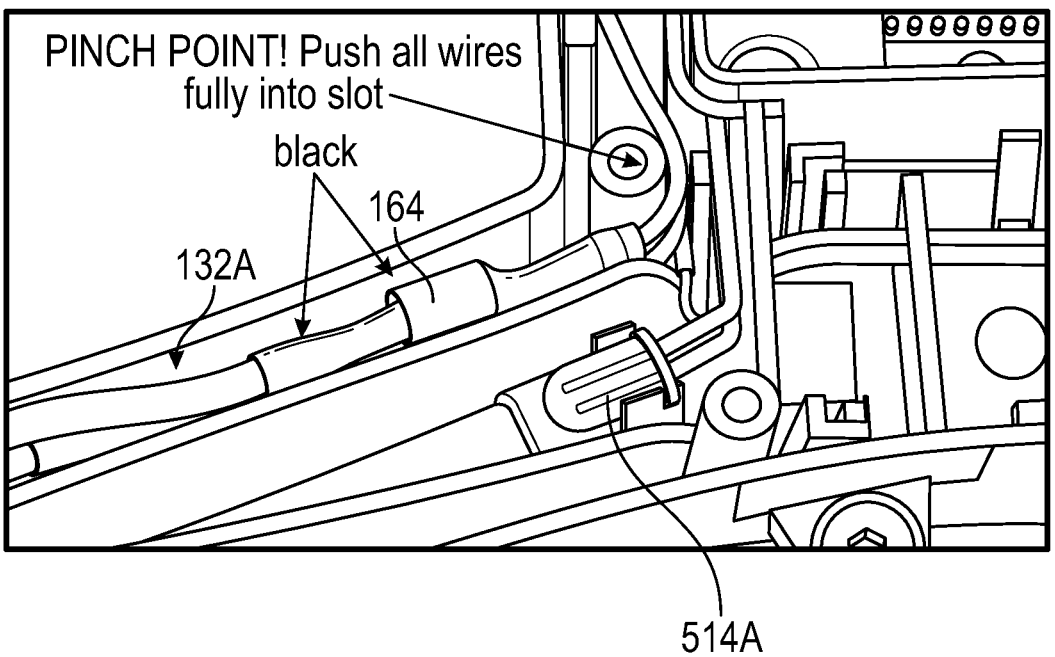
FIGS. 42 and 43 are bottom views of the arm showing the wires being retained in the wire channel.
Figure 43:
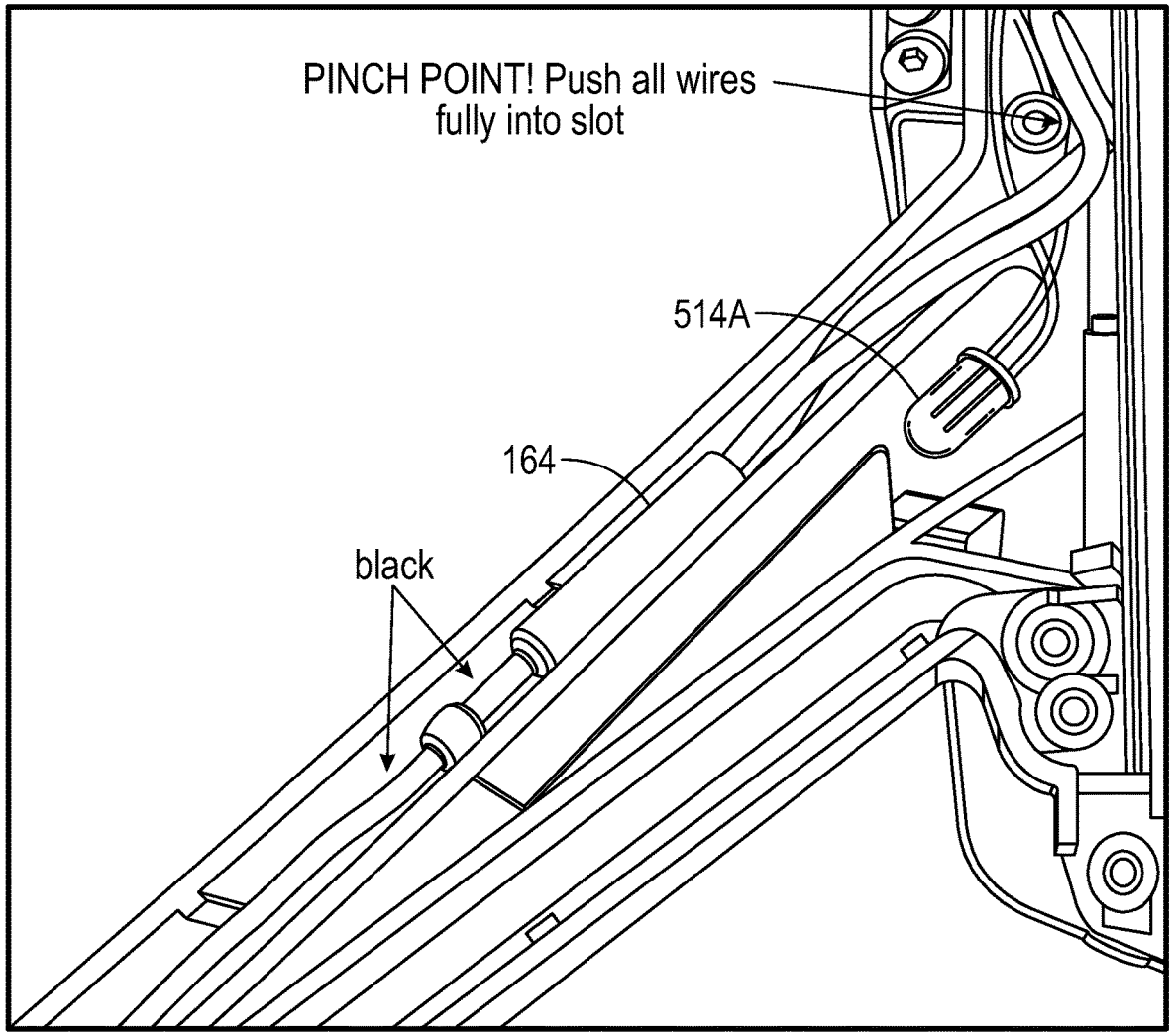

As shown in FIG. 42, the wires connecting the motor 101 to the ESC board 600 may also be wrapped around bosses molded into the chassis 502 and secured in slots in the underside of the chassis 502. Alternatively, the wires may be secured using clips, detents, other mechanical fasteners, and the like to secure and retain the wires within the chassis 502. With the wires between the motor 910 and the ESC board connected, the wires may then be positioned flush within the wire grooves 234 A, B as shown in FIG. 43.

Roll Hoop

As shown in FIG. 1, the model rotorcraft 1000 may also comprise a roll hoop 700 mounted on the top surface of the rotorcraft 1000. According to the embodiment shown, the roll hoop 700 may perform many functions including: acting as a carry handle that a user may use to carry and transfer the rotorcraft 1000; operate as a GPS mast that may separate the GPS of the rotorcraft 100 from the main body of the rotorcraft 1000, thereby reducing potential magnetic interference; contain an indicator light that may be seen from the rear of the rotorcraft 1000; and operating as a high-mounted camera mount to externally mount a camera to the rotorcraft 1000.

Figure 51:
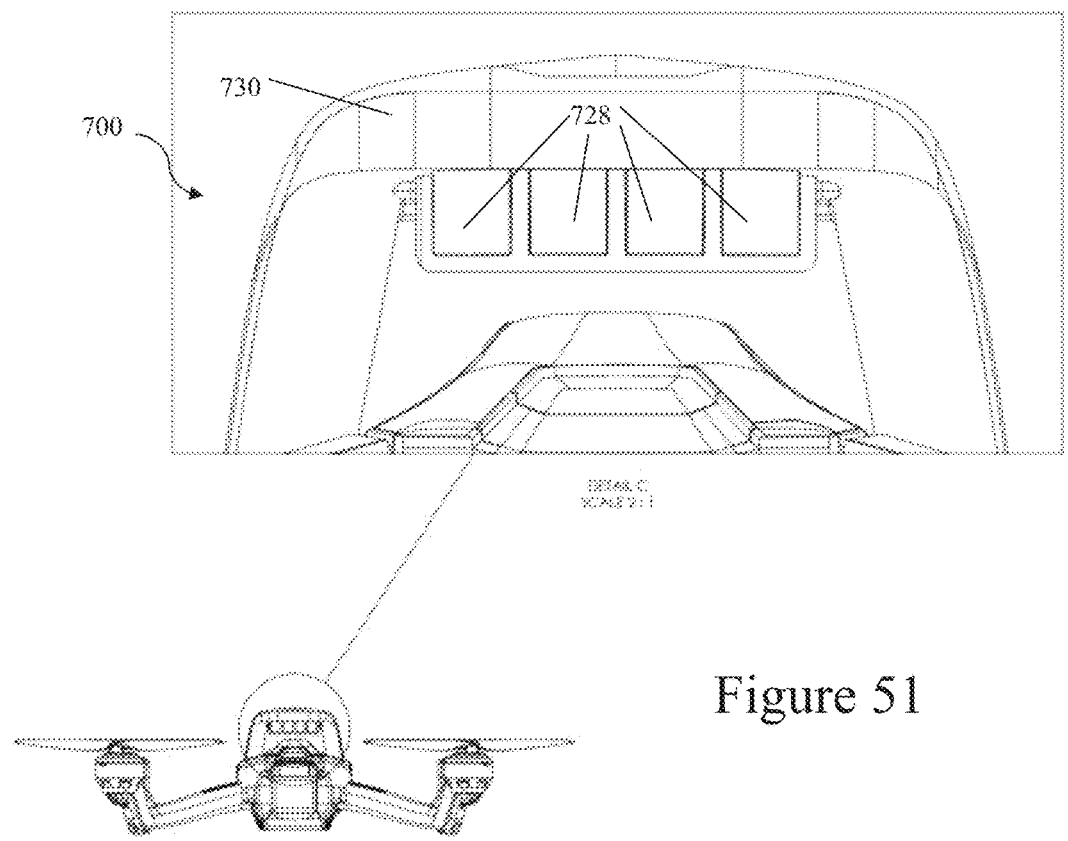
FIG. 51 is an enlarged view of the indicator lights on the rear of the roll hoop.

Turning to FIGS. 44-47, and 51-52, the roll hoop 700 may comprise a sensor board mount 702 and a roll hoop canopy (704 in FIG. 51). In alternative embodiments, additional, fewer, or different components than those shown may be provided. The roll hoop 700 may be comprised of a single piece of rigid or semi-rigid material. For example, in a particular embodiment, the roll hoop 700 may be made from nylon or other similar material. It will be understood by persons of ordinary skill in the art that the roll hoop 700 may alternatively be made from any other suitable material (e.g. plastics, metals, wood, and composites) based on the requirements for flight of the particular radio controlled model rotorcraft embodiment and other structural, aesthetic, and cost factors.

Figure 44:
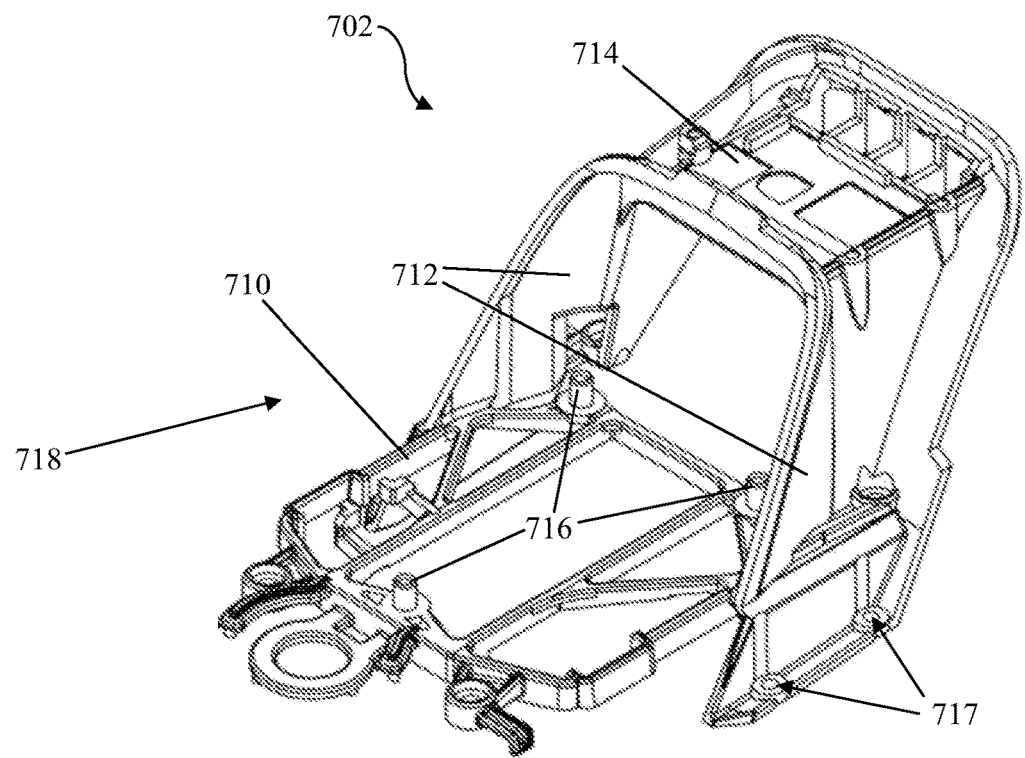
Figure 45:
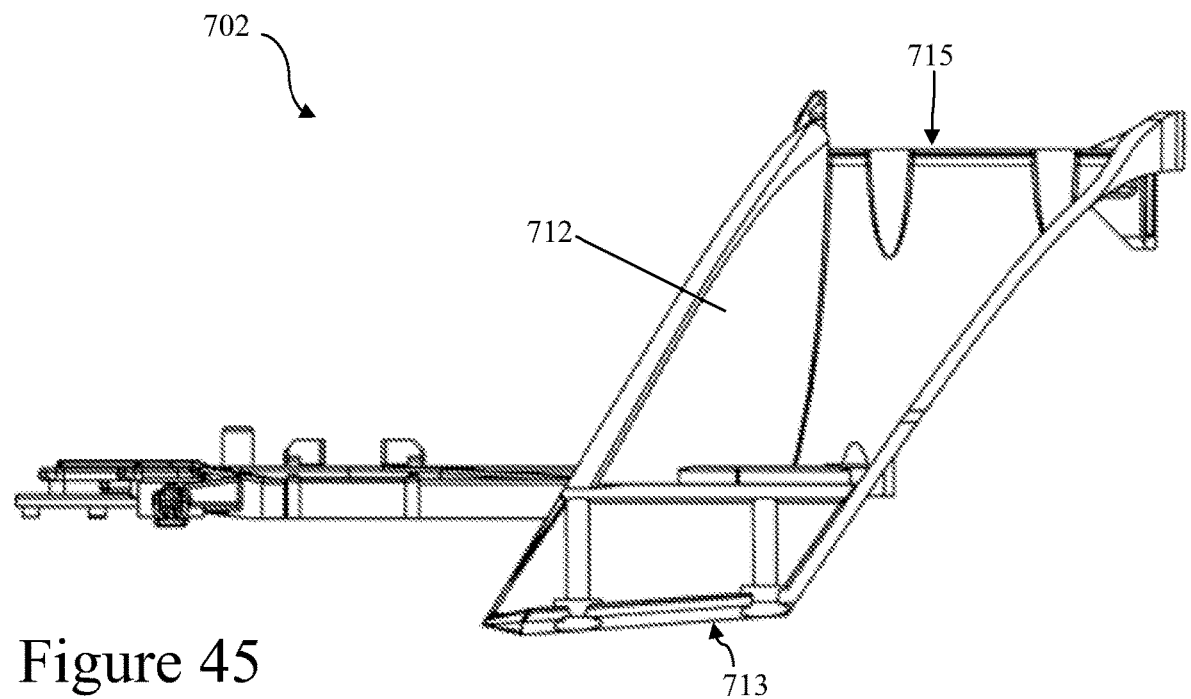

As shown in FIG. 44, the sensor board mount 702 may comprise a control mount frame 710, two side panels 712, and a top panel 714. The side panels 712 and the top panel 714 may be connected to an enclosure or canopy over the control mount frame 710. The control mount frame 710 may comprise three bosses 716 that may be used to mount a flight control board (602 in FIG. 48) to the control mount frame 710. The control mount frame 710 may comprise various cutouts of various shapes to aid in maintaining a light weight for the rotorcraft 1000. As shown in FIG. 45, the two side panels 712 may comprise a mount edge 713 and a top edge 715. The mounting edge 713 of the side panel 712 may comprise two openings 717 that a mechanical fastener may be used to secure the roll hoop 700 to the rotorcraft 1000. Each of the two side panels 712 may be formed to be substantially the shape of a parallelogram. The control mount frame 710 may be connected to the two side panels 712 along a lower mid-portion of the side panel 712, such that a smaller portion of the side panels 712 may extend below the control mount frame 710 and a larger portion may extend above. The top edges 715 of the two side panels 712 may be connected to the top panel 714 of the sensor board mount 702 to form a "U" shaped enclosure. With the top edges of the side panels 712 connected to the top panel 714, the parallelogram shaped side panels 712 may form an off-set canopy when the bottom edge 713 of the side panels 712 are aligned parallel with the control mount frame 710. As shown in FIG. 46, the top panel 714 extends beyond the edges of the bottom edge 713 of the side panels 712. The two side panels 712 may connect to the control mount frame 710 such that the mounting edges 713 may be substantially parallel to the body of the control mount frame 710. As shown in FIG. 46, the two side panels may be attached near the rear end of the control mount frame 710 whereby the top panel 714 between the top edges 715 of the two side panels 712 may extend beyond the rear of the control mount frame 710. As shown in FIG. 47, the two side panels 712 connected by the top panel 714 and positioned over the control mount frame 710 forms a quadrilateral opening 718 enclosed by the control mount frame 710, the two side panels 712, and the top panel 714.

Turning to FIG. 48, the sensor board mount 702 may be used to mount the flight control board 602 and the sensor board 604 for the rotorcraft 1000. The flight control board 602 may be positioned on the control mount frame 710 inside the quadrilateral opening 718. The flight control board 602 may be isolated from the sensor board mount 702 by locator members 733 which may be made from a flexible or compliant material such as rubber, plastic, foam, or the like that may be resilient and capable of elastic deformation. The locator members 733 may provide vibration absorbing protection to the flight control board 602, insulating the board 602 from impacts during operation of the rotorcraft 1000, as well as from vibrations induced by the rotation of the propellers 104, 204, 304, 404. The flight control board 602 may be secured to the control mount frame 710 by three fasteners 720 fastened into the three bosses 717 in the control mount frame 710 and the locator members 733.

Figure 49:
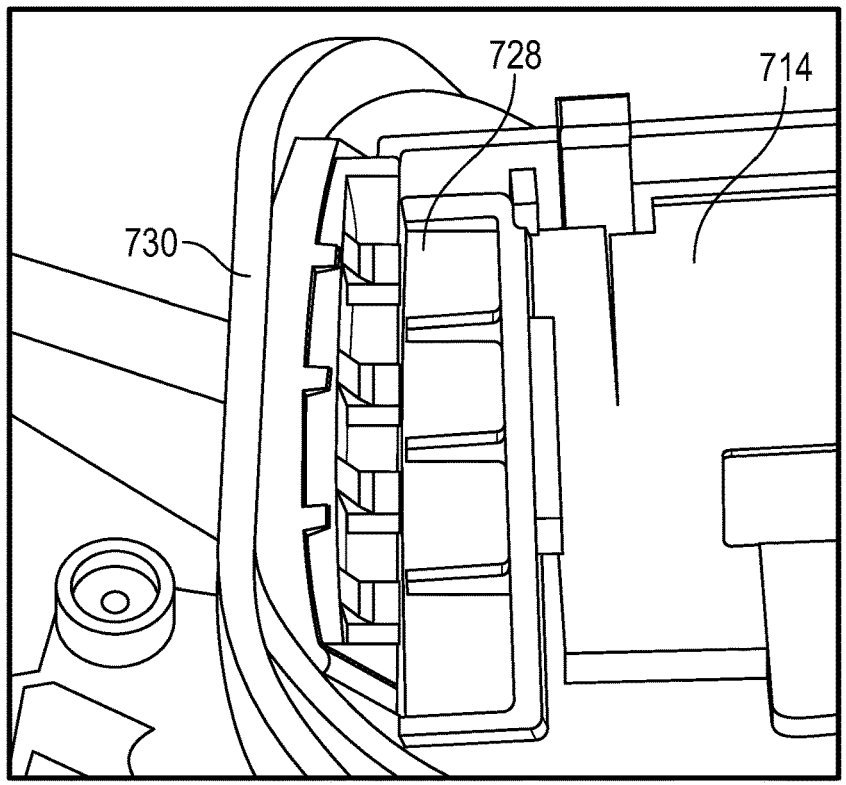
FIG. 49 is a top view of the status light pipe being mounted on the top panel of the sensor board mount.

A status light pipe 728 and the sensor board 604 may be installed on the top surface 724 of the top panel 714. The sensor board 604 may be mounted on substantially the entire top panel 714 except for four quadrilateral cutouts 726 along the rear edge of the top panel 714. As shown in FIG. 49, wires from the sensor board 604 may be routed down the outer surface of the side panel 712. The wires from the sensor board 604 may be fitted through an opening in the side panel 712 and plugged into the flight control board 602 secured on the control frame mount 710.

Figure 50:
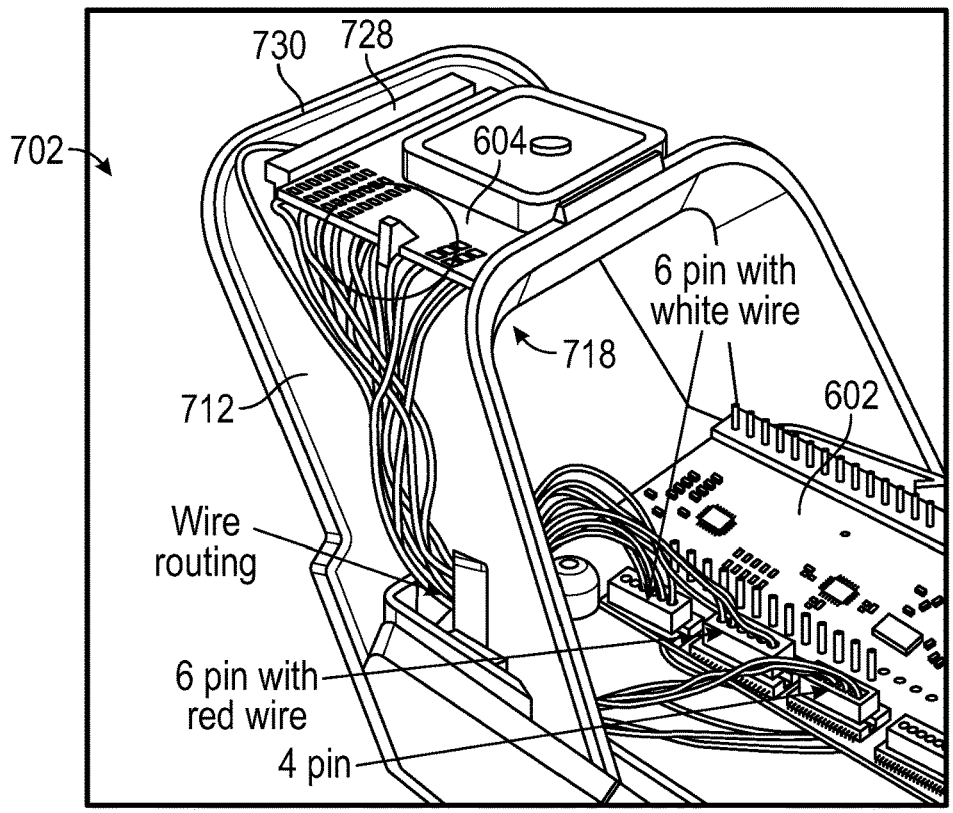
FIG. 50 is a perspective view of the sensor board and the status light pipe mounted on the sensor board mount.
Figure 52:
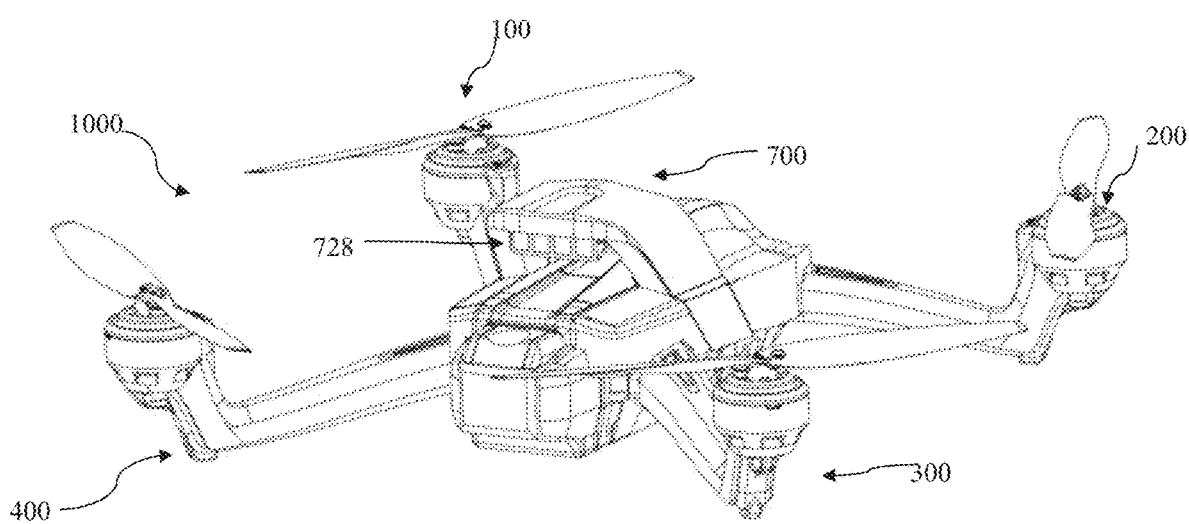
FIG. 52 is a perspective rear view of the rotorcraft.

The top surface of the top panel 714 may comprise four quadrilateral cutouts 726 near the rear perimeter of the panel 714. The perimeter of the top panel 714 and the side panels 712 may all extend outwardly creating a raised edge along the perimeter of each of the panels 712, 714. As shown in FIGS. 49 and 50, a status light pipe 728 may be installed over the quadrilateral cutouts 726 on the top panel 712 adjacent to the sensor board 604. The quadrilateral cutouts 726 may permit the status light pipe 728 to be exposed through the raised edge 730 long the rear perimeter of the top panel 714, as shown in FIGS. 51 and 52. This may permit the status light pipe 728 to operate as an indicator light or taillights for the rotorcraft 1000 and be seen from the rear of the rotorcraft 1000.

FIGS. 53 and 54 show a roll hoop canopy 704 that may then be coupled to the sensor board mount 702 after the sensor board mount 702 is secured to the chassis 502. The roll hoop canopy 704 may comprise two canopy side panels 732 and a canopy top panel 734. The canopy side and top panels 732, 734 may be formed to be substantially the same shape and size as the side panels 712 and the top panel 714 of the sensor board mount 702. As shown in FIG. 53, the canopy side panels 732 may also be substantially parallelogram shaped. The canopy side panels 732 may be connected to the canopy top panel 734 to form an off-set "U" shaped enclosure similar to the side panels 712 and the top panel 714 of the sensor board mount 702. The roll hoop canopy 704 may comprise two bosses 736 with bores 738 on the interior side of each of the canopy side panels 732 that a mechanical fastener may be fastened into to attach the roll hoop 700 to the sensor board mount 702. The roll hoop canopy 704 may be mounted over the sensor board mount 702 enclosing the status light pipe 728 and the sensor board 704 between the top panel 714 of the sensor board mount 702 and the canopy top panel 734. The raised edges along the perimeter of the side panels 712 and the top panel 714, including raised rear edge 730 on the top panel 714 leaves space and creates an enclosure between the sensor board mount 702 and the canopy top panel 734 when the two are coupled. This may prevent the roll hoop canopy 704 from interfering with the sensor board 604 or the wires extending from it when coupling with the sensor board mount 702.

Figure 56:
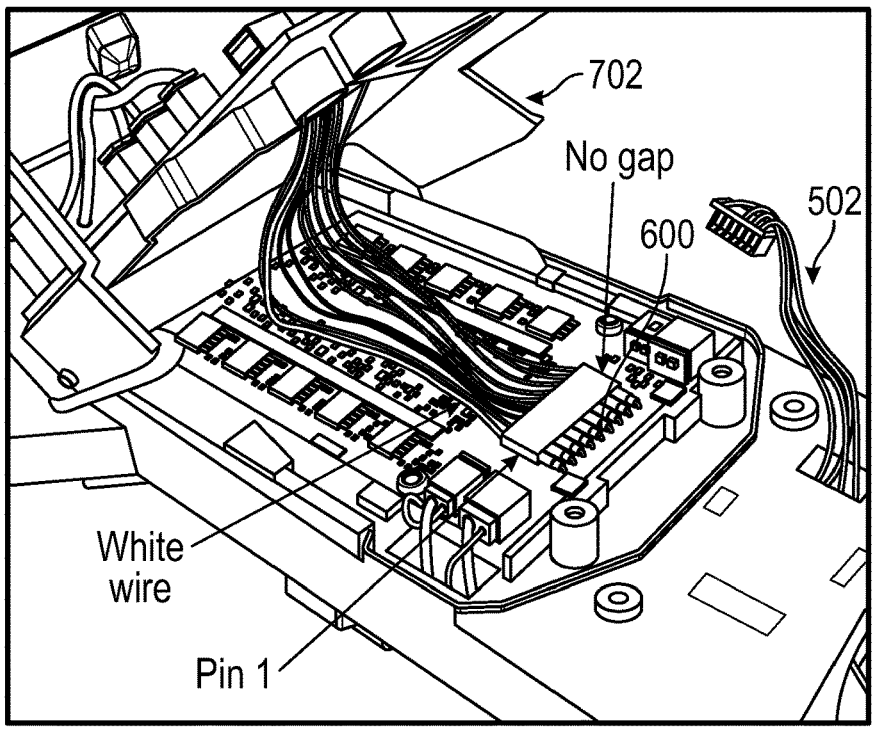
FIG. 56 is a perspective view of the sensor board mount being positioned over the ESC board and the chassis.
Figure 57:
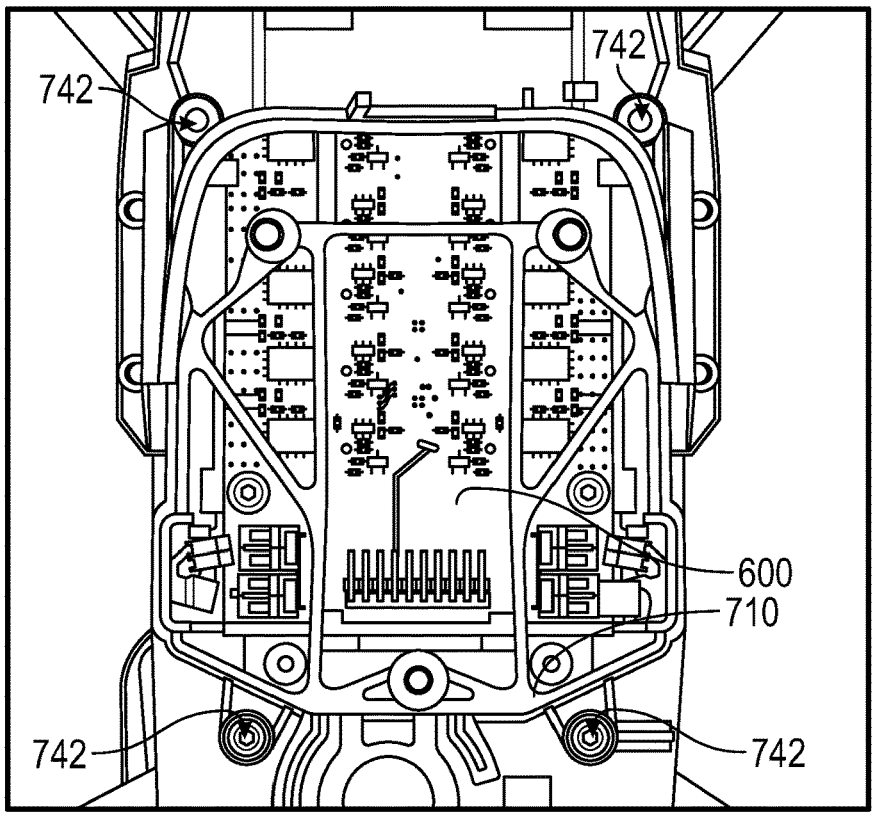
FIG. 57 is a top view of the sensor board mount being secured to the chassis.

With the flight control board 602, sensor board 604, and the status light pipe 728 attached to the sensor board mount 702, the sensor board mount 702 may be connected to the chassis 502. The sensor board mount 702 may be positioned over the ESC board 600 and the chassis 502, as shown in FIG. 56. The control board harness may then be connected to the ESC board 600, and the sensor board mount 702 may then be secured to the chassis 502 by four mechanical fasteners 742 fastening the control mount frame 710 into the chassis 502, as shown in FIG. 57. The roll hoop canopy 704 may be installed on top of the sensor board mount 702 using four mechanical fasteners fastened from the bottom into the openings 738.

The roll hoop 700 may operate as a GPS mast that may separate the GPS of the rotorcraft 100 from the main body of the rotorcraft 1000, thereby reducing potential magnetic interference. The sensor board mount 702 may elevate any of the GPS, Compass, or external magnetometer module of the rotorcraft 1000 above the main body of the rotorcraft 1000. This may aid in avoiding potential interference issues from electronic noise generated from the motor control circuitry, the power regulation circuitry, and the like.

Figure 58:
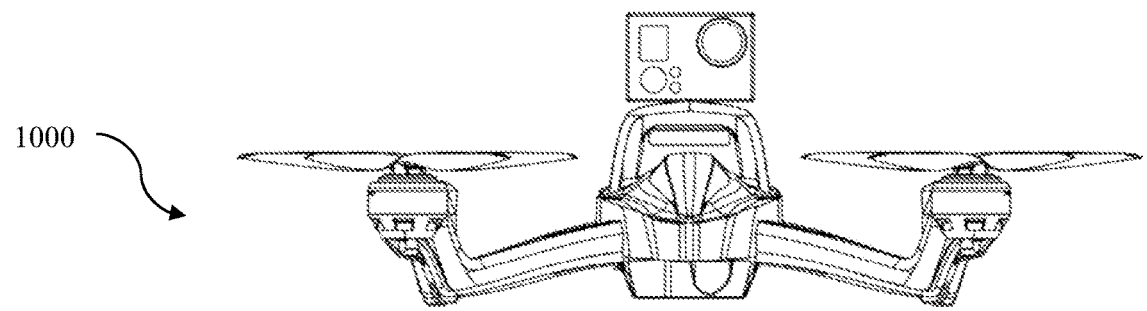
FIGS. 58-60 are front, perspective, and side views, respectively, of a GoPro camera mounted on the roll hoop.
Figure 59:
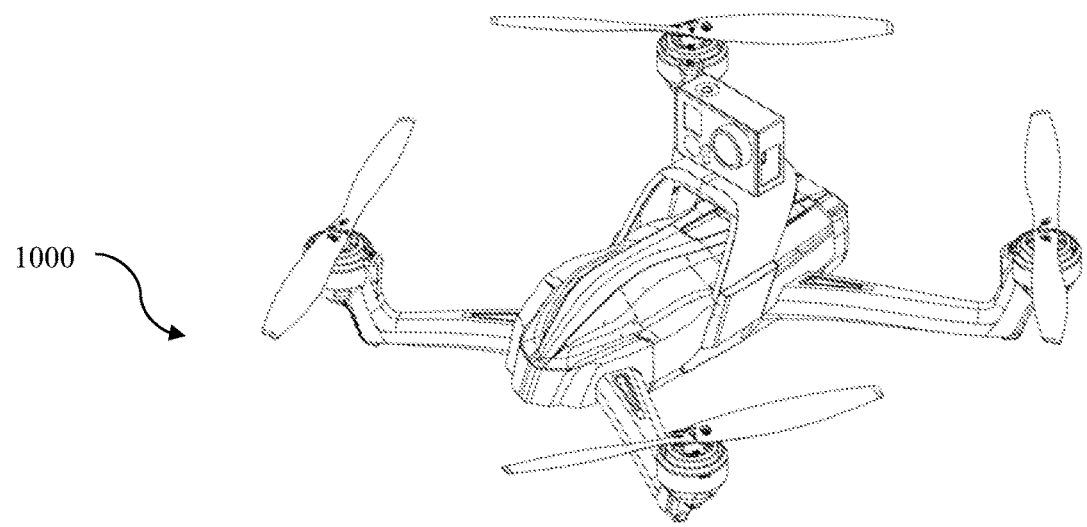
Figure 60:
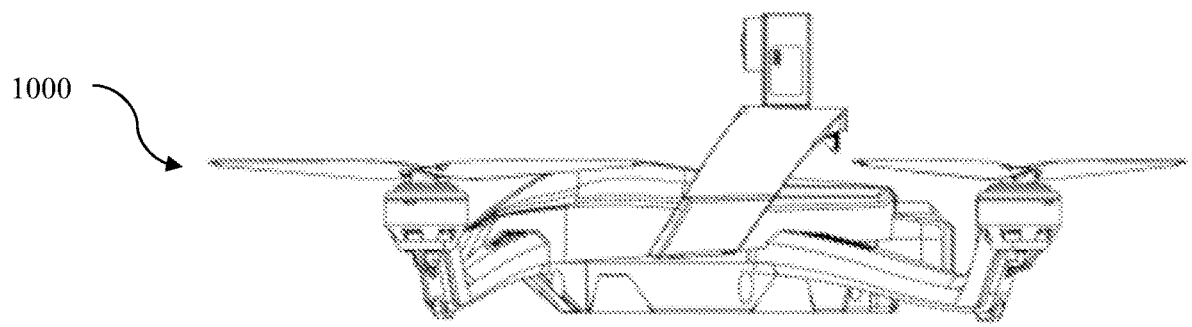
Figure 61:
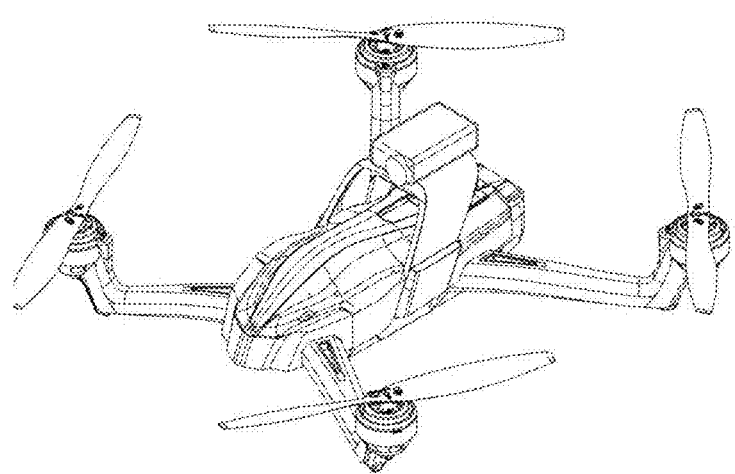
FIGS. 61-63 are perspective, side, and front views, respectively, of a Mobius camera mounted on the roll hoop.
Figure 62:
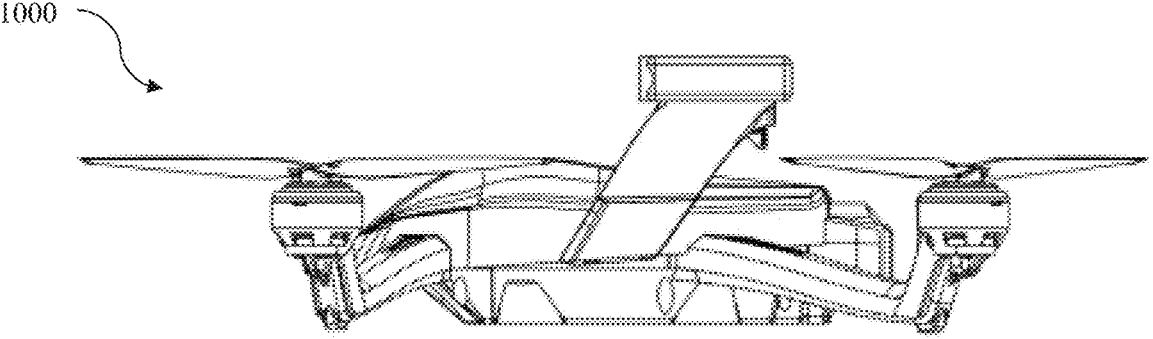
Figure 63:
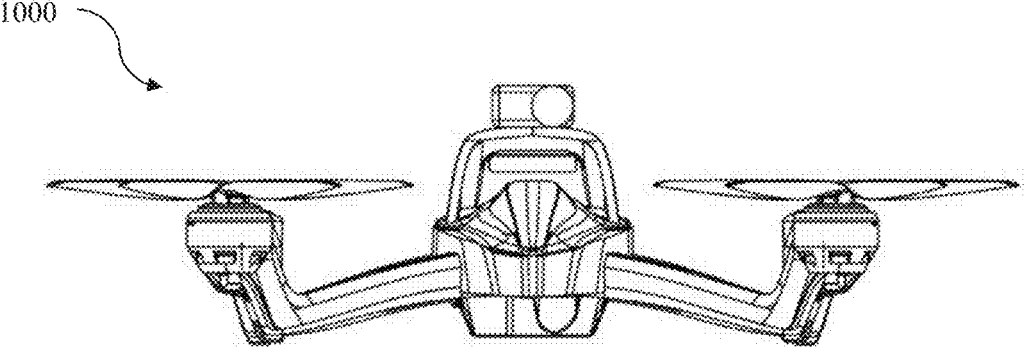

Furthermore, the roll hoop 700 may operate as a high camera mount whereby an external camera may be mounted on top of the roll hoop 700. Alternatively, a camera may be constructed as part of the roll hoop 700 to equip an embodiment of the rotorcraft 1000 with a camera. FIGS. 58-60 show an example of a GoPro camera mounted on the roll hoop 700 of the model rotorcraft 1000. FIGS. 61-63 show another example of a Mobius action camera mounted on the roll hoop 700 of the model rotorcraft 1000. Alternatively, any camera or other electronic device may be configured to be mounted on the roll hoop 700.

I claim:

1. A radio controlled model rotorcraft, comprising:
   a plurality of rotor assemblies, wherein each of the plurality of the rotor assemblies is provided at an outboard end of a support member of an arm and comprises:
      a rotor portion comprising a motor and a motor ring, wherein the motor further comprises a motor axis;
      a light source disposed adjacent to the rotor portion and configured to transmit light to the motor ring;
   wherein the motor ring comprises a motor ring material that distributes the light from the adjacent light source throughout a volume of the motor ring material;
   wherein the motor ring surrounds the motor axis and is located about the rotor portion; and
   wherein the motor ring is removably coupled to the rotor portion separate from the support arm.

2. The radio controlled model rotorcraft of claim 1, wherein the motor ring is provided at one end of the rotor portion.

3. The radio controlled model rotorcraft of claim 1, wherein each of the plurality of rotor assemblies further comprises:
   a foot member composed of a resiliently deformable material; and
   wherein the foot member is disposed beneath the rotor portion.

4. The radio controlled model rotorcraft of claim 1, wherein each of the motor rings is configured to have a specific illuminating color.

5. The radio controlled model rotorcraft of claim 1, wherein each of the plurality of rotor assemblies further comprises a motor base configured to distribute light and located at a bottom portion of the rotor portion.

6. The radio controlled model rotorcraft of claim 5, wherein each of the motor bases is illuminated by a second light source.

7. The radio controlled model rotorcraft of claim 5, wherein each of the motor bases is a different color than the motor ring proximate to the motor base.

8. A radio controlled model rotorcraft, comprising:
   a sensor board mount located above a rotorcraft body, wherein the rotorcraft body comprises a flight control board;
   wherein the sensor board mount comprises:
      a top mount panel extending between a first mount panel and a second mount panel coupling the top panel to the rotorcraft body;
      wherein the top mount panel comprises:
         an illuminating portion comprising an illuminating portion material configured to distribute light throughout a volume of the illuminating portion material;
         a light source configured to distribute light to the illuminating portion material;
      a sensor board; and
   wherein the sensor board mount elevates the sensor board above the rotorcraft body reducing electrical interference from the flight control board.

9. The radio controlled model rotorcraft of claim 8, wherein the sensor board comprises at least one of a positioning module, a directional module, a GPS, an electronic compass, or an external magnetometer module.

10. The radio controlled model rotorcraft of claim 8, wherein the sensor board mount further comprises a camera disposed adjacent the top mount panel.

11. The radio controlled model rotorcraft of claim 8, wherein the electrical interference is magnetic interference.

12. The radio controlled model rotorcraft of claim 8, wherein the illuminating portion indicates a status of the radio controlled model rotorcraft.

13. The radio controlled model rotorcraft of claim 8, wherein the illuminating portion are taillights for the radio controlled model rotorcraft.

14. A radio controlled model rotorcraft, comprising:
a plurality of rotor assemblies, wherein each of the plurality of the rotor assemblies is provided at an outboard end of a support member of an arm and comprises:
 a rotor portion comprising a motor and a motor ring, wherein the motor further comprises a motor axis;
 a light source disposed adjacent to the rotor portion and configured to transmit light to the motor ring;
a sensor board mount located above a rotorcraft body, wherein the rotorcraft body comprises a flight control board;
wherein the sensor board mount comprises:
 a top mount panel comprising a sensor board and extending between a first mount panel and a second mount panel coupling the top panel to the rotorcraft body;
wherein the sensor board mount elevates the sensor board above the rotorcraft body reducing electrical interference from the flight control board;
wherein the motor ring comprises a motor ring material that distributes the light from the adjacent light source throughout a volume of the motor ring material;
wherein the motor ring surrounds the motor axis and is located about the rotor portion; and
wherein the motor ring is removably coupled to the rotor portion separate from the support arm.

15. The radio controlled model rotorcraft of claim 14, wherein each of the pluralities of rotor assemblies further comprises a motor base configured to distribute light and located at a bottom portion of the rotor portion.

16. The radio controlled model rotorcraft of claim 15, wherein each of the motor bases is illuminated in a different color than the motor ring located adjacent to the motor base.

17. The radio controlled model rotorcraft of claim 14, wherein the top mount further comprises:
an illuminating portion comprising an illuminating portion material configured to distribute light throughout a volume of the illuminating portion material; and
a light source configured to distribute light to the illuminating portion material.

18. The radio controlled model rotorcraft of claim 17, wherein the illuminating portion indicates a status of the radio controlled model rotorcraft.

19. The radio controlled model rotorcraft of claim 17, wherein the illuminating portion are taillights for the radio controlled model rotorcraft.

20. The radio controlled model rotorcraft of claim 15, wherein the motor base is illuminated by a second light source.

* * * * *